US010516804B2

(12) United States Patent
Utsunomiya

(10) Patent No.: US 10,516,804 B2
(45) Date of Patent: Dec. 24, 2019

(54) IMAGE PROCESSING DEVICE, IMAGE PROCESSING SYSTEM, AND NON-TRANSITORY COMPUTER READABLE MEDIUM

(71) Applicant: SEIKO EPSON CORPORATION, Tokyo (JP)

(72) Inventor: Kohei Utsunomiya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/041,942

(22) Filed: Jul. 23, 2018

(65) Prior Publication Data
US 2019/0028606 A1 Jan. 24, 2019

(30) Foreign Application Priority Data
Jul. 24, 2017 (JP) .................................. 2017-142702

(51) Int. Cl.
H04N 1/405 (2006.01)
H04N 1/52 (2006.01)
G06K 15/02 (2006.01)
G06K 15/10 (2006.01)
H04N 1/407 (2006.01)

(52) U.S. Cl.
CPC .......... *H04N 1/4051* (2013.01); *H04N 1/405* (2013.01); *G06K 15/107* (2013.01); *G06K 15/1876* (2013.01); *G06K 15/1878* (2013.01); *G06K 15/1881* (2013.01); *H04N 1/407* (2013.01); *H04N 1/4055* (2013.01); *H04N 1/52* (2013.01)

(58) Field of Classification Search
CPC .... H04N 1/4051; H04N 1/405; H04N 1/4055; H04N 1/407; H04N 1/52; G06K 15/107; G06K 15/1876; G06K 15/1881
USPC ....................... 358/3.13, 1.9, 3.06
See application file for complete search history.

(56) References Cited

U.S. PATENT DOCUMENTS

2007/0058203 A1* 3/2007 Pellar ................. H04N 1/40087
358/3.13
2017/0324885 A1* 11/2017 Ochiai ................. H04N 1/6008

FOREIGN PATENT DOCUMENTS

| JP | 09-016513 A | 1/1997 |
|----|-------------|--------|
| JP | 11-005331 A | 1/1999 |
| JP | 11-185035 A | 7/1999 |
| JP | 11-232450 A | 8/1999 |
| JP | 3965987 B2 | 8/2007 |
| JP | 5853474 B2 | 2/2016 |

* cited by examiner

Primary Examiner — Quang N Vo
(74) Attorney, Agent, or Firm — Global IP Counselors, LLP

(57) ABSTRACT

A technique capable of keeping image quality and speeding up a halftone process is provided. An image processing device performs the halftone process on image data in which a pixel has a pixel value conforming to a bit count N. Bits conforming to the bit count N include higher H bits (where H is an integer satisfying an inequality of $1 \leq H < N$) and lower L bits following the higher H bits (where L is an integer satisfying an inequality of $1 \leq L \leq N-H$). The image processing device includes a first halftone processing unit configured to generate dot data indicative of a formation state of a dot, with respect to a first pixel allowing a determination of a formation state of a dot, based on the higher H bits in the pixel value and higher H bits in a dither mask.

13 Claims, 16 Drawing Sheets

IMAGE PROCESSING DEVICE, IMAGE PROCESSING SYSTEM, AND NON-TRANSITORY COMPUTER READABLE MEDIUM

BACKGROUND

1. Technical Field

The disclosure relates to a technique of performing a halftone process on image data using a dither mask.

2. Related Art

An ink jet printer may perform a halftone process on multi-tone image data transferred from a host device, such as a personal computer. Pixels in the image data each have a $2^N$-tone pixel value (N may be 8 or 16, for example). For example, when a printer uses inks C (cyan), M (magenta), Y (yellow), and K (black), and when image data is indicative of amounts of use of the inks C, M, Y, and K, a formation state of dots of the inks C, M, Y, and K is determined in accordance with a result of comparison between the pixel value in the image data and a threshold in a dither mask.

In the image processing device illustrated in JP-A-11-185035, when a matrix in a size of $2^{(n/2)} \times 2^{(n/2)}$ is used to generate a binary value image from a $2^{2n}$ multi-tone image, a signal at a $2^{2n}$ level is separated into a higher $2^n$ bit and a lower $2^n$ bit. When the lower $2^n$ bit is greater than a value in the matrix, the higher $2^n$ bit increases by one. When the lower $2^n$ bit is smaller than the value in the matrix, the higher $2^n$ bit is kept unchanged. At this time, a pixel with the value in the matrix, which is greater than a value of the higher $2^n$ bit, is assigned with a value of 0, while a pixel with the value in the matrix, which is smaller than the value of the higher $2^n$ bit, is assigned with a value of 1.

The above described technique reduces a value of $2^{2n}$ for a multi-tone image to a higher $2^n$ bit, compares a resultant value with a value in a matrix, and determines a binary value. Therefore, information about a lower $2^n$ bit is reflected to a binary value image at a certain degree, reducing image quality of the binary value image. This is not limited to a case when an ink jet printer performs a halftone process, but is observed when various devices perform a halftone process.

SUMMARY

A technique capable of keeping image quality and speeding up a halftone process is provided.

An image processing device according to one aspect of the disclosure is configured to perform a halftone process on image data in which a pixel has a pixel value conforming to a bit count N. Bits conforming to the bit count N include higher H bits (where H is an integer satisfying an inequality of $1 \leq H < N$) and lower L bits following the higher H bits (where L is an integer satisfying an inequality of $1 \leq L \leq N-H$). The image processing device includes a first halftone processing unit configured to generate dot data indicative of a formation state of a dot, with respect to a first pixel allowing a determination of a formation state of a dot, based on the higher H bits in the pixel value and higher H bits in a dither mask, and a second halftone processing unit configured to generate the dot data, with respect to a second pixel disallowing the first halftone processing unit to determine a formation state of a dot, based on at least the lower L bits in the pixel value and at least lower L bits in the dither mask.

A non-transitory computer readable medium storing an image processing program allowing a computer to achieve functions corresponding to the units of the above described image processing device is further provided.

Further, an image processing system according to another aspect of the disclosure includes a host device configured to transmit image data in which a pixel has a pixel value conforming to a bit count N, and an image processing device configured to receive the image data from the host device to perform a halftone process on the image data. Bits conforming to the bit count N include higher H bits (where H is an integer satisfying an inequality of $1 \leq H < N$) and lower L bits following the higher H bits (where L is an integer satisfying an inequality of $1 \leq L \leq N-H$). The host device includes a first transmission processing unit configured to transmit, to the image processing device, first data in which data of the higher H bits in the pixel value is collected from the image data, and a second transmission processing unit configured to transmit, after the first data is transmitted, to the image processing device, second data in which data of the lower L bits in the pixel value is collected from the image data. The image processing device includes a first reception processing unit configured to receive the first data, a first halftone processing unit configured to generate dot data indicative of a formation state of a dot, with respect to a first pixel allowing a determination of a formation state of a dot, based on the higher H bits in the pixel value included in the first data and higher H bits in a dither mask, a second reception processing unit configured to receive the second data, and a second halftone processing unit configured to generate the dot data, with respect to a second pixel disallowing the first halftone processing unit to determine a formation state of a dot, based on at least the lower L bits in the pixel value included in the second data and at least lower L bits in the dither mask.

Further, an image forming device according to still another aspect of the disclosure is configured to form dots based on image data in which a pixel has a pixel value conforming to a bit count N. Bits conforming to the bit count N include higher H bits (where H is an integer satisfying an inequality of $1 \leq H < N$) and lower L bits following the higher H bits (where L is an integer satisfying an inequality of $1 \leq L \leq N-H$). A first halftone processing unit configured to generate dot data indicative of a formation state of a dot, with respect to a first pixel allowing a determination of a formation state of a dot, based on the higher H bits in the pixel value and higher H bits in a dither mask, a second halftone processing unit configured to generate the dot data, with respect to a second pixel disallowing the first halftone processing unit to determine a formation state of a dot, based on at least the lower L bits in the pixel value and at least lower L bits in the dither mask, and a dot formation unit configured to form the dots in accordance with the dot data are further included.

Therefore, a technique capable of keeping image quality and speeding up a halftone process is provided.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Exemplary embodiments of the disclosure will now be described herein. Note that some exemplary embodiments are mere examples. Features illustrated in the some exemplary embodiments may not be fully included in the disclosure.

(1) Outline of Technique Included in the Disclosure

Figure 1:
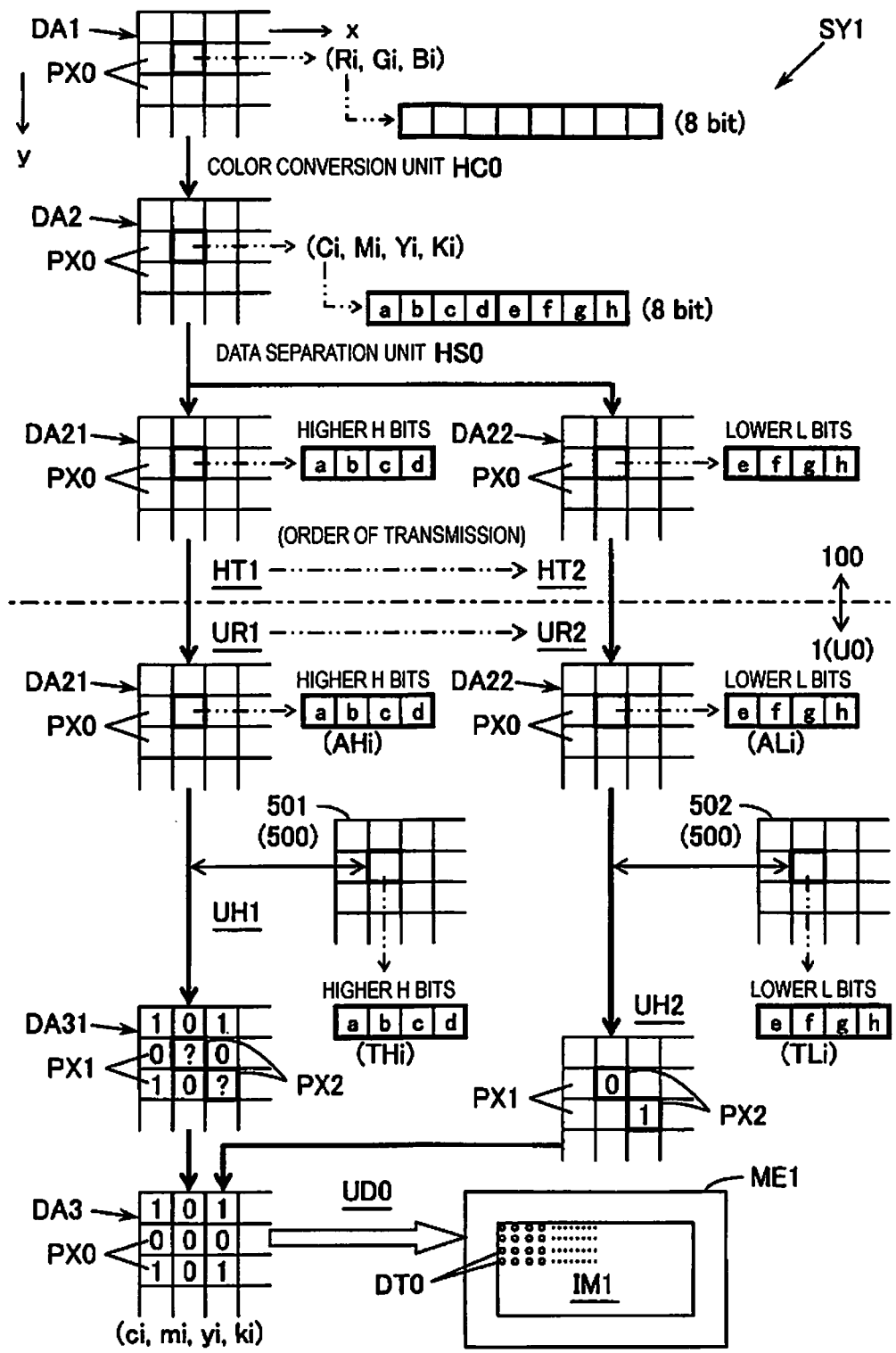
FIG. 1 is a diagram schematically illustrating an example of a flow of a process to be performed in an image forming system including an image processing system.

With reference to examples illustrated in FIGS. 1 to 16, the outline of the technique included in the disclosure will first be described. In particular, FIG. 1 schematically illustrates an example of a process to be performed in units of an image processing system. The drawings accompanied to the application merely schematically illustrate examples. Therefore, discrepancy may arise among the drawings. Obviously, elements in the technique are not limited to the elements illustrated with signs and included in the specific examples.

First Aspect

As illustrated in FIG. 1, for example, an image processing device U0 (e.g., included in a printer 1) according to one aspect of the technique is the image processing device U0 configured to perform a halftone process on image data (e.g., ink amount data DA2) in which a pixel PX0 has a pixel value Ai conforming to a bit count N. The image processing device U0 includes a first halftone processing unit UH1 and a second halftone processing unit UH2. Bits conforming to the bit count N include higher H bits (where H is an integer satisfying an inequality of $1 \leq H < N$) and lower L bits following the higher H bits (where L is an integer satisfying an inequality of $1 \leq L \leq N-H$). The first halftone processing unit UH1 is configured to generate dot data DA3 based on the higher H bits (e.g., data AHi) in the pixel value Ai and higher H bits (e.g., threshold THi) in a dither mask 500. The dot data DA3 is indicative of a formation state of a dot DT0, with respect to a first pixel allowing a determination of a formation state of the dot DT0 (e.g., determined pixel PX1). The second halftone processing unit UH2 is configured to generate the dot data DA3, with respect to a second pixel disallowing the first halftone processing unit UH1 to determine a formation state of the dot DT0 (e.g., undetermined pixel PX2), based on at least the lower L bits in the pixel value Ai and at least lower L bits in the dither mask 500.

In the first aspect, the dot data DA3 is first generated, with respect to the first pixel (PX1) allowing the determination of a formation state of the dot DT0, based on the higher H bits (AHi) in the pixel value Ai and the higher H bits (THi) in the dither mask 500. The dot data DA3 is generated, with respect to the second pixel (PX2) disallowing a determination of a formation state of the dot DT0, based on at least the lower L bits in the pixel value Ai and at least the lower L bits in the dither mask 500. Therefore, the first aspect provides the image processing device capable of keeping image quality and speeding up the halftone process.

A count H for higher H bits may be an integer satisfying an inequality of $1 \leq H < N$, for example. A count H for higher H bits may be an integer satisfying an inequality of $2 \leq H \leq N-2$, for example. A count L for lower L bits may be an integer satisfying an inequality of $1 \leq L \leq N-H$, for example. A count L for lower L bits may be an integer satisfying an inequality of $2 \leq L \leq N-H$, for example. A count H+L acquired by adding higher H bits and lower L bits may be equal to the bit count N for a pixel value, as well as may be below the bit count N in a range satisfying the above described conditions. In other words, lower L bits follow higher H bits. A lower bit further following lower L bits may be included in bits conforming to the bit count N. The additional remarks in the above described first aspect are also applicable to the following aspects.

Second Aspect

Figure 8:
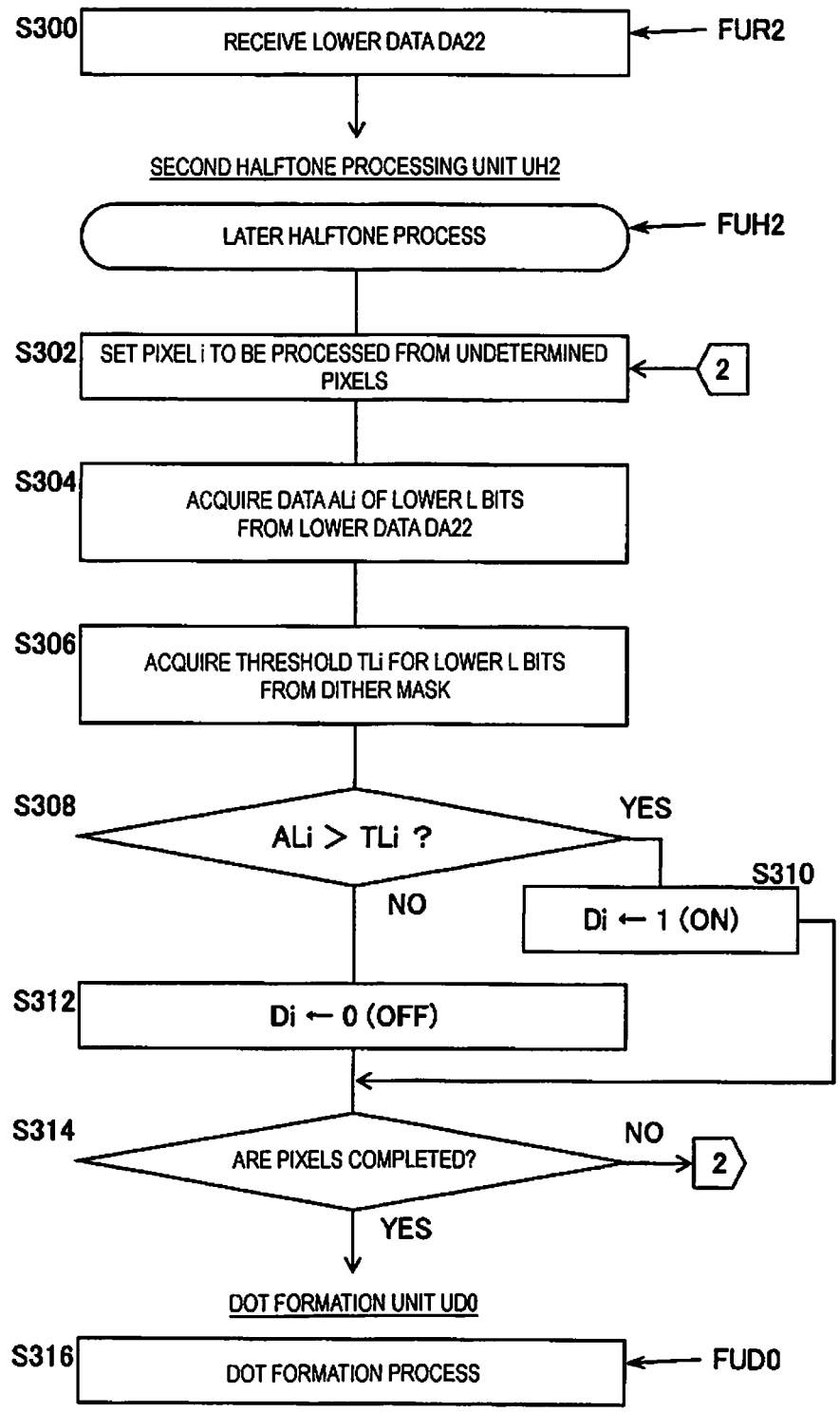
FIG. 8 is a flowchart illustrating, together with an example of a process of receiving second data and a process of forming dots, an example of a process to be performed in a second halftone processing unit.

As illustrated in FIG. 8, for example, the second halftone processing unit UH2 may be configured to generate the dot data DA3, with respect to the second pixel (PX2), based on lower L bits (e.g., data AHi) in the pixel value Ai and lower L bits (e.g., threshold THi) in the dither mask 500. The second aspect generates the dot data DA3 without using data of higher H bits, with respect to the second pixel (PX2) disallowing the first halftone processing unit UH1 to determine a formation state of the dot DT0. Therefore, the second aspect provides an example of keeping image quality and speeding up a halftone process. Although not included in the second aspect, the second halftone processing unit may generate the dot data, with respect to the second pixel, based on higher H bits and lower L bits in the pixel value and the higher H bits and lower L bits in the dither mask. The additional remark is also applicable to the following aspects.

Third Aspect

Figure 7:
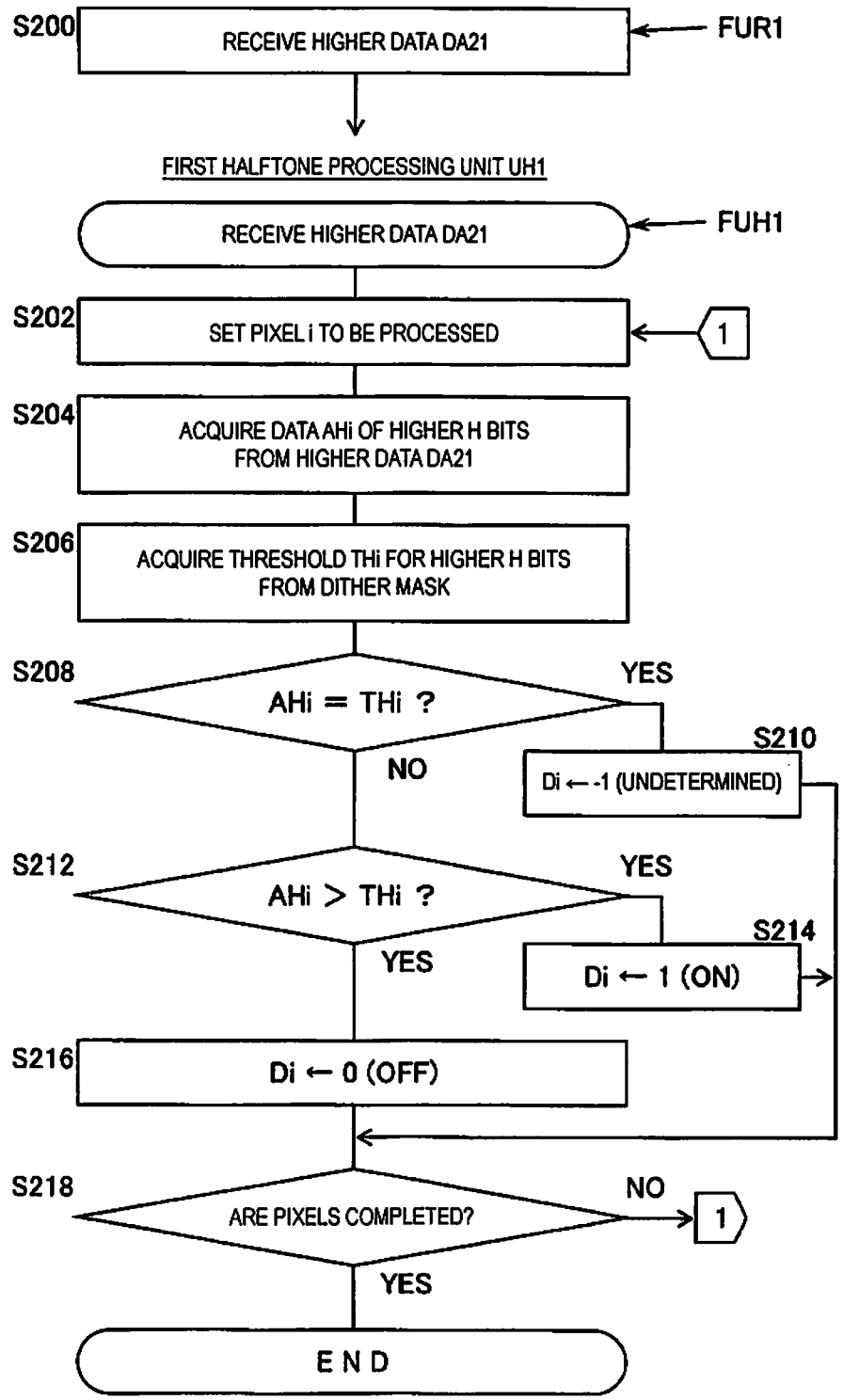
FIG. 7 is a flowchart illustrating, together with an example of a process of receiving first data, an example of a process to be performed in a first halftone processing unit.

As illustrated in FIG. 7, for example, the first halftone processing unit UH1 may determine, as the first pixel (PX1), a pixel in which higher H bits (data AHi) in the pixel value Ai and higher H bits (threshold THi) in the dither mask differ from each other to generate the dot data DA3 with respect to the first pixel (PX1). The third aspect determines, with a simple process, the first pixel (PX1) allowing the dot data DA3 to be generated, providing an example of keeping image quality and speeding up a halftone process.

Fourth Aspect

As illustrated in FIG. 7, for example, the first halftone processing unit UH1 may determine, with respect to the first pixel (PX1), when a value (e.g., data AHi) with respect to higher H bits in the pixel value Ai is greater than a value (e.g., threshold THi) with respect to higher H bits in the dither mask 500, the dot data DA3 to a value (e.g., 1) at which the dot DT0 is to be formed. The first halftone processing unit UH1 may also determine, when the value (AHi) with respect to the higher H bits in the pixel value Ai is smaller than the value (THi) with respect to the higher H bits in the dither mask 500, the dot data DA3 to a value (e.g., 0) at which the dot DT0 is not to be formed. As illustrated in FIG. 8, for example, the second halftone processing unit UH2 may determine, with respect to the second pixel (PX2), when a value (e.g., data ALi) with respect to lower L bits in the pixel value Ai is greater than at least a value (e.g., threshold TLi) with respect to the higher H bits in the dither mask 500, the dot data DA3 to a value (e.g., 1) at which the dot DT0 is to be formed. The second halftone processing unit UH2 may also determine, when the value (ALi) with respect to the lower L bits in the pixel value Ai is smaller than at least the value (TLi) with respect to the higher H bits in the dither mask 500, the dot data DA3 to a value (e.g., 0) at which the dot DT0 is not to be formed. The fourth aspect provides an example of keeping image quality and speeding up a halftone process.

Fifth Aspect

Figure 15A:
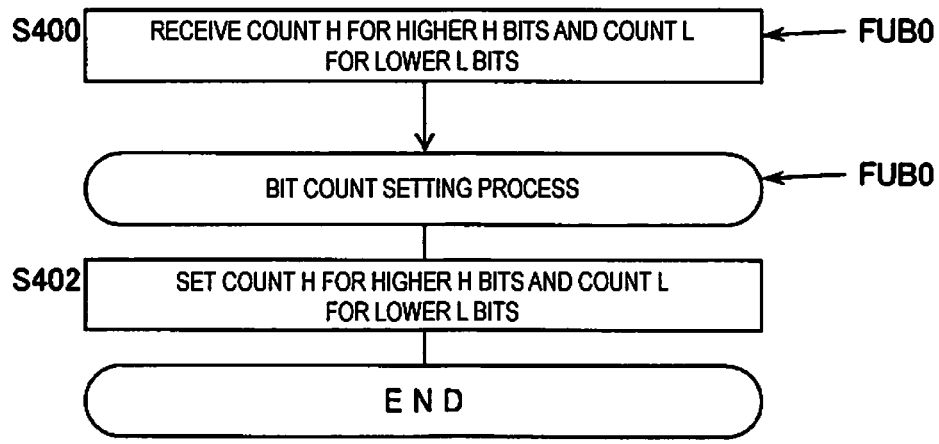
FIG. 15A is a flowchart illustrating an example of a process to be performed in a reception side bit count alteration unit.
Figure 15B:
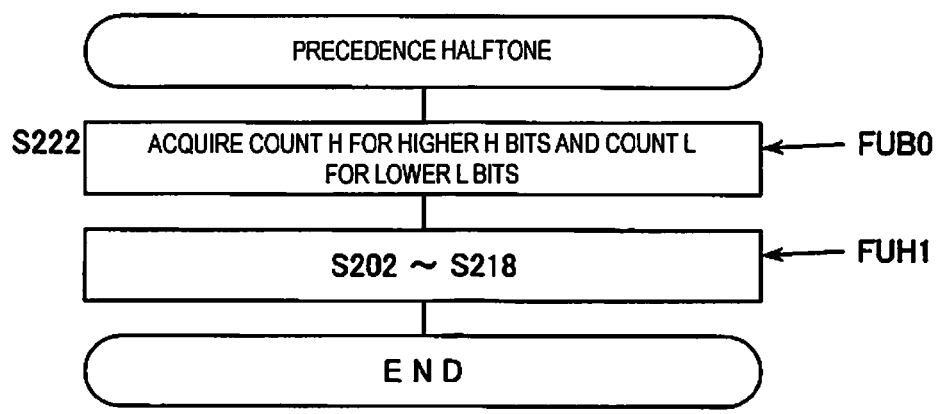
FIG. 15B is a flowchart illustrating an example of a process to be performed in the first halftone processing unit.
Figure 15C:
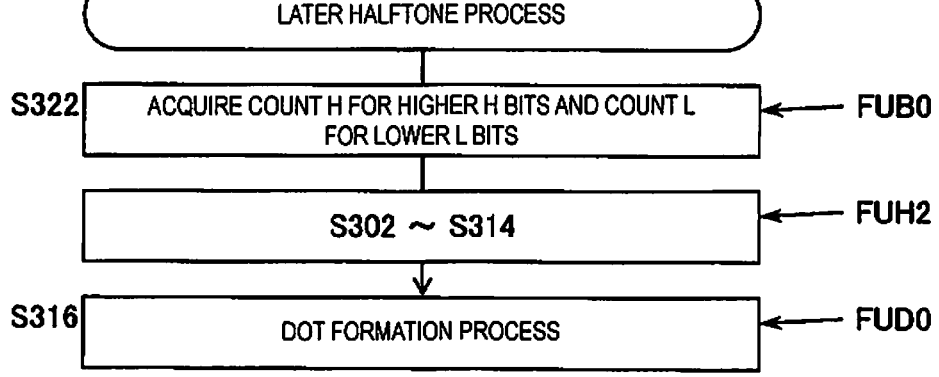
FIG. 15C is a flowchart illustrating an example of a process to be performed in the second halftone processing unit.

As illustrated in FIGS. 15A to 15C, the image processing device U0 may further include a bit count alteration unit UB0. The bit count alteration unit UB0 is configured to alter a bit count for at least one of higher H bits included in bits conforming to the bit count N and lower L bits included in the bits conforming to the bit count N. The fifth aspect improves a degree of freedom in the halftone process, such as altering at least one of the higher H bits and the lower L bits in accordance with a bit count for the pixel value Ai in the image data (DA2), for example. Although not included in the fifth aspect, the disclosed technique further includes a case in which no bit count alteration unit is included in the image processing device.

Sixth Aspect

As illustrated in FIG. 1, for example, an image processing system according to another aspect of the technique includes a host device 100 and the image processing device U0. The host device 100 is configured to transmit image data (e.g., ink amount data DA2) in which the pixel PX0 has the pixel value Ai conforming to the bit count N. The image processing device U0 is configured to receive the image data (DA2) from the host device 100 to perform the halftone process on the image data (DA2). The host device 100 includes a first transmission processing unit HT1 and a second transmission processing unit HT2. The first transmission processing unit HT1 is configured to transmit, to the image processing device U0, first data (e.g., higher data DA21) in which data of higher H bits in the pixel value Ai is collected from the image data (DA2). The second transmission processing unit HT2 is configured to transmit, after the first data (DA21) is transmitted, to the image processing device U0, second data (e.g., lower data DA22) in which data of lower L bits in the pixel value Ai is collected from the image data (DA2). The image processing device U0 includes a first reception processing unit UR1 configured to receive the first data (DA21), the first halftone processing unit UH1, a second reception processing unit UR2 configured to receive the second data (DA22), and the second halftone processing unit UH2. The first halftone processing unit UH1 is configured to generate the dot data DA3, with respect to the first pixel (e.g., determined pixel PX1) allowing a determination of a formation state of the dot DT0, based on higher H bits (e.g., data AHi) in the pixel value Ai included in the first data (DA21) and higher H bits (e.g., threshold THi) in the dither mask 500. The dot data DA3 is indicative of the formation state of the dot DT0. The second halftone processing unit UH2 is configured to generate the dot data DA3, with respect to the second pixel (e.g., undetermined pixel PX2) disallowing the first halftone processing unit UH1 to determine a formation state of the dot DT0, based on at least lower L bits in the pixel value Ai included in the second data (DA22) and at least lower L bits in the dither mask 500.

In the sixth aspect, the dot data DA3 is first generated, with respect to the first pixel (PX1) allowing the determination of a formation state of the dot DT0, based on the higher H bits (AHi) in the pixel value Ai included in the first data (DA21) to be first transmitted and the higher H bits (THi) in the dither mask 500. The dot data DA3 is generated, with respect to the second pixel (PX2) disallowing a determination of a formation state of the dot DT0, based on at least the lower L bits in the pixel value Ai included in at least the second data (DA22) and at least the lower L bits in the dither mask 500. Therefore, the sixth aspect provides the image processing system capable of keeping image quality and speeding up the halftone process.

Seventh Aspect

As illustrated in FIG. 1, for example, an image forming device according to still another aspect of the technique is configured to form the dot DT0 based on image data (e.g., ink amount data DA2) in which the pixel PX0 has the pixel value Ai conforming to the bit count N. The image forming device includes the first halftone processing unit UH1, the second halftone processing unit UH2, and a dot formation unit UD0. The first halftone processing unit UH1 is configured to generate the dot data DA3, with respect to a first pixel (e.g., determined pixel PX1) allowing a determination of a formation state of the dot DT0, based on higher H bits (e.g., data AHi) in the pixel value Ai and higher H bits (e.g., threshold THi) in the dither mask 500. The dot data DA3 is indicative of the formation state of the dot DT0. The second halftone processing unit UH2 is configured to generate the dot data DA3, with respect to a second pixel (e.g., undetermined pixel PX2) disallowing the first halftone processing unit UH1 to determine a formation state of the dot DT0, based on at least lower L bits in the pixel value Ai and at least lower L bits in the dither mask 500. The dot formation unit UD0 is configured to form the dot DT0 in accordance with the dot data DA3.

In the seventh aspect, the dot data DA3 is first generated with respect to the first pixel (PX1) allowing the determination of a formation state of the dot DT0, based on the higher H bits (AHi) in the pixel value Ai and the higher H bits (THi) in the dither mask 500. The dot DT0 is then formed in accordance with the dot data DA3. The dot data DA3 is generated with respect to the second pixel (PX2) disallowing a determination of a formation state of the dot DT0, based on at least the lower L bits in the pixel value Ai and at least the lower L bits in the dither mask 500. The dot DT0 is then formed in accordance with the dot data DA3. Therefore, the seventh aspect provides the image forming device capable of keeping image quality and speeding up the halftone process. The image forming device includes a printing apparatus and a display device, for example.

Eighth Aspect

As illustrated in FIG. 1, for example, an image processing program according to still another aspect of the technique is configured to allow a computer to achieve functions corresponding to the units in the first aspect. The functions include a first halftone processing function FUH1 corresponding to the first halftone processing unit UH1, and a second halftone processing function FUH2 corresponding to the second halftone processing unit UH2. The aspect provides the image processing program capable of keeping image quality and speeding up the halftone process. The image processing program may allow the computer to achieve a bit count alteration function FUB0 corresponding to the bit count alteration unit UB0, a first reception processing function FUR1 corresponding to the first reception processing unit UR1, and a second reception processing function FUR2 corresponding to the second reception processing unit UR2.

Further, the technique is applicable to a complex system including an image processing device, an image processing method, an image forming method, a control method for an image forming device, a control method for a complex system, a control program for an image forming device, a control program for a complex system, and a computer readable medium recorded with an image processing program and the control programs, for example. The above described devices may include a plurality of dispersed units.

Figure 2:
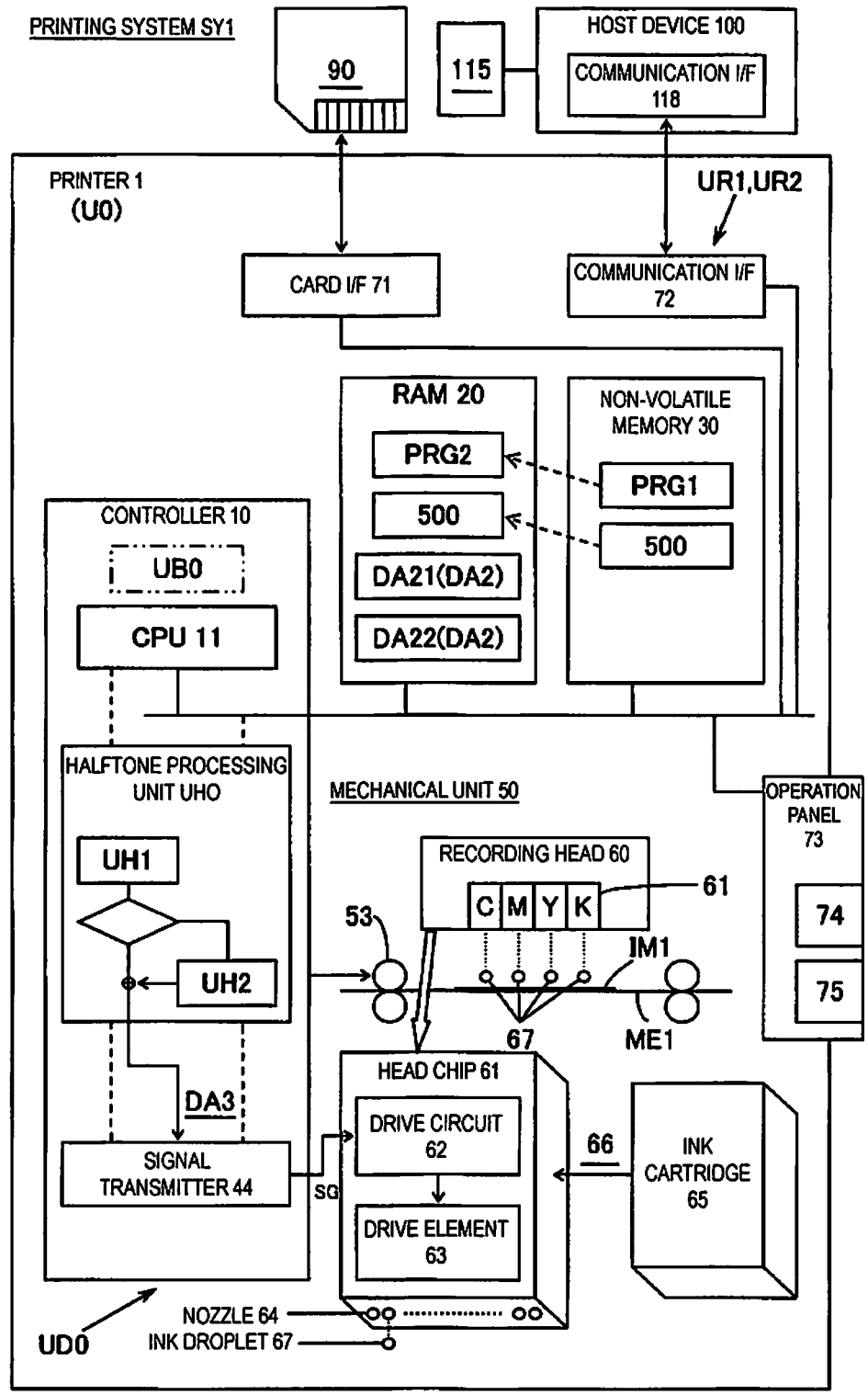
FIG. 2 is a block diagram schematically illustrating, together with a host device, a configuration example of an image forming device including an image processing device.
Figure 3:
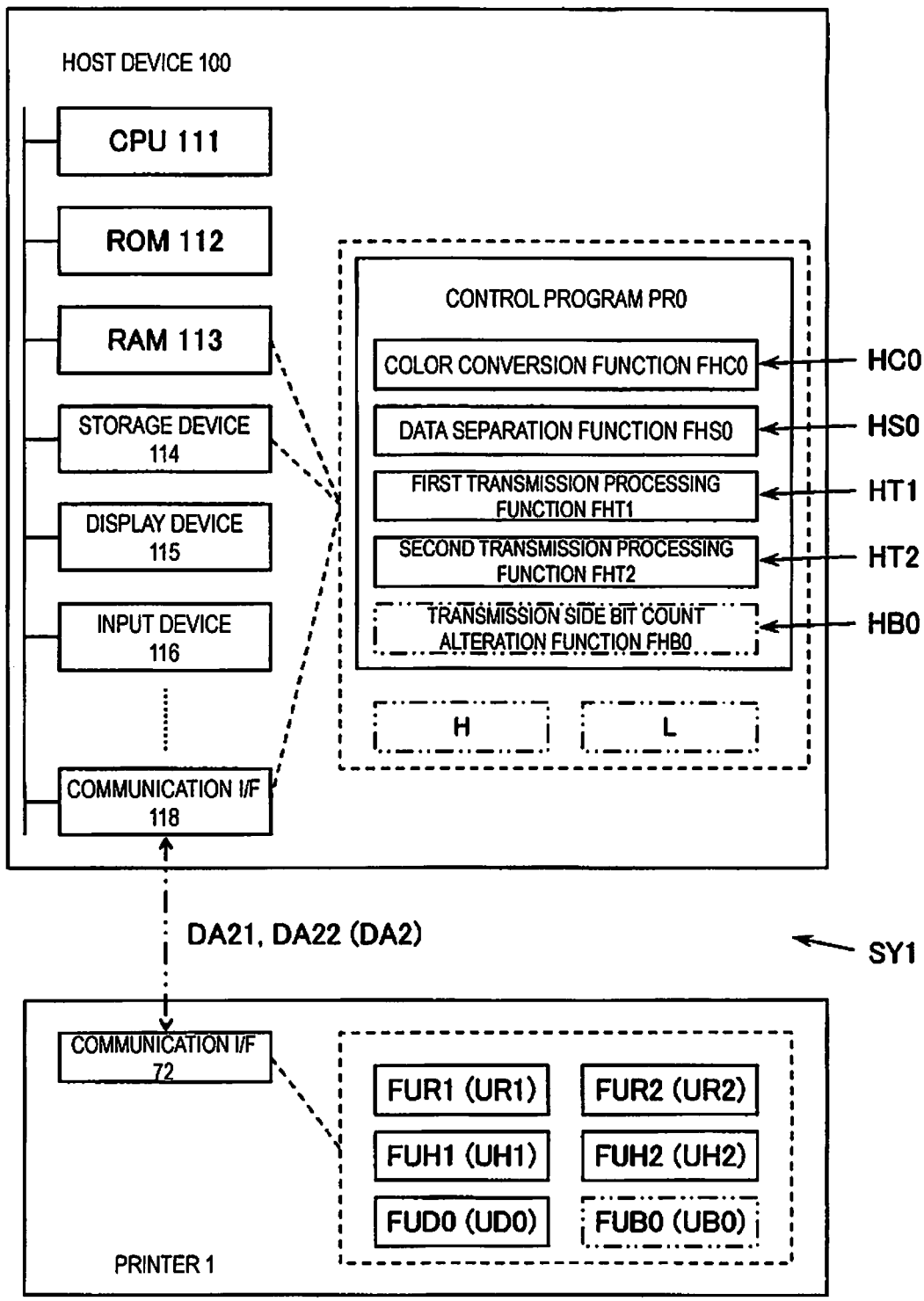
FIG. 3 is a block diagram schematically illustrating, together with the image forming device, a configuration example of the host device.

(2) Specific Example of Configuration of Image Forming System Including Image Processing Device FIG. 1 schematically illustrates a flow of a process to be performed in a printing system SY1 that is an example of an image forming system. FIG. 2 schematically illustrates, together with the host device 100, a configuration of the ink jet printer 1 as an example of an image forming device. FIG. 3 schematically illustrates, together with the printer 1, a configuration of the host device 100.

The printer 1 illustrated in FIG. 2 is configured to print an output image IM1 onto a print-target object (print substrate) ME1 by using, as color materials, inks 66 including C (cyan), M (magenta), Y (yellow), and K (black). The inks may further include Lc (light cyan) having a lower concentration than a concentration of C, Lm (light magenta) having a lower concentration than a concentration of M, Dy (dark yellow) having a higher concentration than a concentration of Y, Lk (light black) having a lower concentration than a concentration of K, LLk (light-light black) having a lower concentration than a concentration of Lk, R (red), Or (orange), Gr (green), and an uncolored ink used to improve image quality, for example. The technique is also applicable even when one or more of the color materials of C, M, Y, and K is not used. Image forming devices to which the technique is applicable include electro-graphic printers such as laser printers, three-dimensional printers, copying machines, facsimiles, complex machines having such functions, and display devices, for example.

The printer 1 illustrated in FIG. 2 includes a controller 10, a Random Access Memory (RAM) 20, a non-volatile memory 30, a mechanical unit 50, interfaces (I/Fs) 71 and 72, and an operation panel 73, for example. The controller 10, the RAM 20, the non-volatile memory 30, the I/Fs 71 and 72, and the operation panel 73 are configured to input and output information into and from each other. The printer 1 may be a line printer configured to allow a line head extending over a print-target object in its full width to eject ink droplets to form dots on the print-target object, or may be a serial printer configured to allow a recording head to move back and forth.

The controller 10 includes a Central Processing Unit (CPU) 11, a halftone processing unit UH0, and a signal transmitter 44, for example. The controller 10 may include the reception side bit count alteration unit UB0. A System on a Chip (SoC), for example, may be used to constitute the controller 10. An image processing unit that is independent from the controller 10 may be used to constitute the halftone processing unit UH0. The CPU 11 is configured to mainly perform information processing and controls on the printer 1.

The halftone processing unit UH0 is configured to perform the halftone process based on the dither method on the multi-tone (e.g., $2^8$ tones) ink amount data DA2 (example image data) acquired from the host device 100, for example, to generate the dot data DA3. The dot data DA3 is data indicative of a formation state of the dot DT0 in each of pixels corresponding to the print image IM1, and may be binary value data in which a state where no dot is available corresponds to a value of 0 and a state where a dot is available for formation corresponds to a value of 1, for example. The dot data DA3 may also be multi-value data, such as four-value data in which a state where a no dot is available corresponds to a value of 0, a state where a small dot is available for formation corresponds to a value of 1, a state where a middle dot is available for formation corresponds to a value of 2, and a state where a large dot is available for formation corresponds to a value of 3, for example. The multi-value data may be three-value data or five or more value data. The first halftone processing unit UH1 and the second halftone processing unit UH2 included in the halftone processing unit UH0 will be described later in detail. The signal transmitter 44 is configured to generate, based on the dot data DA3, a drive signal SG corresponding to a voltage signal to be applied to drive elements 63 of each of head chips 61 to output the drive signal SG to drive circuits 62. The dot data DA3 may be rearranged appropriately in an order with which the mechanical unit 50 forms dots.

An Application Specific Integrated Circuit (ASIC) may be used to constitute the units, UH0, and 44 in the controller 10 such that data to be processed may be directly read from the RAM 20, and the processed data may be directly written into the RAM 20.

The mechanical unit 50 controlled by the controller 10 includes a paper-feeding mechanism 53, for example. The paper-feeding mechanism 53 is configured to transport the print-target object ME1. A recording head 60 is mounted with the head chips 61 configured to eject ink droplets 67 (example droplets) of cyan, magenta, yellow, and black (CMYK), for example. The head chips 61 respectively include the drive circuits 62 and the drive elements 63, for example. The drive circuits 62 are configured to apply a voltage signal to the drive elements 63 in accordance with the drive signal SG to be entered from the controller 10. The drive elements 63 may be piezoelectric elements configured to pressurize the inks 66 in pressure chambers communicating to nozzles 64, or drive elements configured to heat the pressure chambers to allow bubbles to occur and to allow the nozzles 64 to eject the ink droplets 67, for example. The pressure chambers in the head chips 61 are supplied with the inks 66 from ink cartridges 65. The ink cartridges 65 and the head chips 61 are respectively paired per each of CMYK, for example. The inks 66 in the pressure chambers are ejected as the ink droplets 67 by the drive elements 63 from the nozzles 64 to the print-target object ME1, such as a sheet of paper to be printed. The dot DT0 of each of the ink droplets 67 is then formed onto the print-target object ME1. Onto the print-target object ME1, the print image IM1 is formed with a plurality of the dots DT0. The mechanical unit 50 mounted with the signal transmitter 44 and the recording head 60 is an example of the dot formation unit UD0.

The RAM 20 stores a program PRG2, the dither mask 500, and the ink amount data DA2, for example. The RAM 20 further stores the dot data DA3 to be generated from the ink amount data DA2, for example. The program PRG2 allows the printer 1 to achieve functions, such as the first halftone processing function FUH1 corresponding to the first halftone processing unit UH1 and the second halftone processing function FUH2 corresponding to the second halftone processing unit UH2. The non-volatile memory 30 is stored with program data PRG1 to be developed into the RAM 20, and the dither mask 500 to be read by the RAM 20, for example. The non-volatile memory 30 may be a magnetic recording medium, such as a Read Only Memory (ROM), a flash memory, and a hard disc, for example. Developing the program data PRG1 means writing the program data PRG1 into the RAM 20 as the program PRG2 interpretable by the CPU 11.

The card I/F 71 is a circuit configured to write data into a memory card 90 and to read data from the memory card 90. The communication I/F 72 is coupled to a communication I/F 118 of the host device 100, and is configured to input and output information into and from the host device 100.

The operation panel 73 includes an output unit 74 and an input unit 75, for example, and is configured to allow a user to enter various instructions to the printer 1. A liquid crystal panel (display unit) may be used to constitute the output unit 74 to display information in accordance with various instructions and information about a state of the printer 1, for example. The output unit 74 may be configured to sound such information. Operation keys including cursor keys and an enter key (operation input unit), for example, may be used to constitute the input unit 75. The input unit 75 may be a touch panel configured to accept an operation onto a display screen, for example.

The host device 100 illustrated in FIG. 3 is electrically coupled with a Central Processing Unit (CPU) 111, a Read Only Memory (ROM) 112, a Random Access Memory (RAM) 113, a storage device 114, a display device 115, an input device 116, and the communication interface (I/F) 118, for example, so as to input and output information into and from each other. The host device 100 may be a computer such as a personal computer (including a tablet terminal), a cellular phone such as a smart phone, a digital still camera, or a digital video camera, for example. The host device 100 may include a single housing accommodating the components 111 to 118, or may include a plurality of devices communicably separated from each other. The technique is also implementable with a host device and a printer, which are integrated with each other.

The storage device 114 is stored with an operating system (OS) (not illustrated), a control program PRO, and setting information (not illustrated), for example. The storage device 114 may store information, such as the count H for higher H bits and the count L for lower L bits, for example. Information stored in the storage device 114 will be appropriately read by the RAM 113 for use in image processing. The storage device 114 may be a non-volatile semiconductor memory such as a flash memory, or a magnetic storage device such as a hard disc, for example. The display device 115 may be a liquid crystal display panel, for example. The input device 116 may include a pointing device, hardware keys such as a keyboard, and a touch panel applied on a surface of a display panel, for example. The communication I/F 118 is coupled to the communication I/F 72 of the printer 1, and is configured to input and output information, such as print data, into and from the printer 1, for example. Standards applied for the communication I/Fs 72 and 118 include Universal Serial Bus (USB) and near field communicate standards, for example. The communication I/Fs 72 and 118 may perform communication in a wireless or wired manner, as well as may perform network communications through a Local Area Network (LAN) or the Internet, for example.

The control program PRO illustrated in FIG. 3 is configured to allow the host device 100 to achieve a color conversion function FHC0, a data separation function FHS0, a first transmission processing function FHT1, and a second transmission processing function FHT2. The control program PRO may be configured to allow the host device 100 to achieve a transmission side bit count alteration function FHB0.

Next, the outline of a flow of forming the print image IM1 from RGB data DA1 in which the pixel PX0 has tone values of R (red), G (green), and B (blue) will now be described with reference to FIG. 1. The host device 100 illustrated in FIG. 1 includes a color conversion unit HC0, a data separation unit HS0, the first transmission processing unit HT1, and the second transmission processing unit HT2.

The color conversion unit HC0 is configured to color convert the RGB data DA1 used to form the print image IM1 into the ink amount data DA2 with respect to CMYK (example image data according to the technique). The pixel PX0 is arranged in order in the data DA1 and DA2 in a x direction (horizontal direction) and a y direction (vertical direction). The pixel PX0 is also arranged in order in the higher data DA21, the lower data DA22, and the dot data DA3, to be described later, in the x direction and the y direction. In the pixels PX0 in the RGB data DA1, a pixel value Ri for R, a pixel value Gi for G, and a pixel value Bi for B are stored. A variable i used herein is a variable used to identify the pixel PX0. In the pixels PX0 in the ink amount data DA2, a pixel value Ci for C, a pixel value Mi for M, a pixel value Yi for Y, and a pixel value Ki for K are stored. The pixel values Ci, Mi, Yi, and Ki may be generally referred to as the pixel value Ai. The pixel values Ri, Gi, Bi, Ci, Mi, Yi, and Ki each take a tone value ranging from 0 to 255 when the bit count N is an eight-bit integer value, or each take a tone value ranging from 0 to 65535 when the bit count N is a 16-bit integer value, for example. Bits in each of the pixel values Ci, Mi, Yi, and Ki will hereinafter be referred to as a, b, c, d, e, f, g, and h in an order from the highest to the lowest.

The data separation unit HS0 is configured to separate the ink amount data DA2 into the higher data DA21 (example first data) of higher H bits (where H is an integer satisfying an inequality of $1 \leq H < N$) and the lower data DA22 (example second data) of lower L bits following the higher H bits (where L is an integer satisfying an inequality of $1 \leq L \leq N-H$). The higher data DA21 is data in which data of higher H bits in the pixel values Ci, Mi, Yi, and Ki is collected from the ink amount data DA2. The lower data DA22 is data in which data of lower L bits in the pixel values Ci, Mi, Yi, and Ki is collected from the ink amount data DA2. When H and L are both specified to four, higher H bits include a, b, c, and d, while lower L bits include e, f, g, and h. A case where H and L are identical to each other is merely an example. An inequality of H>L, such as H=5 and L=3, or an inequality of H<L, such as H=3 and L=5, may be applied. An equation of H+L=N is merely an example. An inequality of H+L<N, where higher H bits include a, b, c, and d, while lower L bits include e, f, and g, for example, may be applied.

The first transmission processing unit HT1 is configured to transmit the higher data DA21 to the printer 1 (including the image processing device U0). The second transmission processing unit HT2 is configured to transmit, after the higher data DA21 is transmitted, the lower data DA22 to the printer 1. The higher data DA21 and the lower data DA22 may be compressed based on a lossless compression method, such as Run Length Encoding, for transmission. A format for data to be transferred, which includes the higher data DA21 and the lower data DA22, is not particularly limited, but any format is applicable, such as a format described with, at a header, size information about the higher data DA21 and the lower data DA22, and a format in which pixels of the higher data DA21 and the lower data DA22 are added with coordinate values.

The printer 1 illustrated in FIG. 1 includes the first reception processing unit UR1, the second reception processing unit UR2, the first halftone processing unit UH1, the second halftone processing unit UH2, and the dot formation unit UD0. The first reception processing unit UR1 is configured to receive the higher data DA21 from the host device 100. When the higher data DA21 is compressed, the first reception processing unit UR1 decodes the higher data DA21 from the compressed data. The second reception processing unit UR2 is configured to receive the lower data DA22 from the host device 100. When the lower data DA22 is compressed, the second reception processing unit UR2 decodes the lower data DA22 from the compressed data. The higher data DA21 is transmitted before the lower data DA22. Therefore, the printer 1 receives the higher data DA21, and then receives the lower data DA22.

The halftone processing units UH1 and UH2 are each configured to convert the $2^8$-tone pixel values Ci, Mi, Yi, and Ki in the ink amount data DA2 into multi-values ci, mi, yi, and ki for the dot data DA3. The multi-values ci, mi, yi, and ki may be generally referred to as a multi-value Di. In the pixels PX0 in the dot data DA3 illustrated in FIG. 1, a binary value ci for C, a binary value mi for M, a binary value yi for Y, and a binary value ki for K are stored.

The first halftone processing unit UH1 is configured to generate the dot data DA3 indicative of a formation state of the dot DT0, with respect to the determined pixel PX1 (example first pixel) allowing a determination of a formation state of the dot DT0, based on the data AHi of the higher H bits a, b, c, and d with respect to the pixel values Ci, Mi, Yi, and Ki and data (threshold THi) of the higher H bits a, b, c, and d in the threshold Ti in the dither mask 500. For convenience, FIG. 1 illustrates data (referred to as higher mask 501) in which the threshold THi including the higher H bits a, b, c, and d is collected from the threshold Ti. When the threshold THi is generated each time a pixel to be processed is set, the higher mask 501 is not generated. FIG. 1 illustrates temporal dot data DA31 in which the determined pixel PX1 stores "1" (dot is available) or "0" (dot is not available), as well as the undetermined pixel PX2 (example second pixel) stores "?" (undetermined, "−1" for example). The temporal dot data DA31 is dot data in which the determined pixel PX1 stores "1" or "0" indicative of a formation state of the dot DT0.

The second halftone processing unit UH2 is configured to generate the dot data DA3, with respect to the undetermined pixel PX2 disallowing the first halftone processing unit UH1 to determine a formation state of the dot DT0, based on at least the lower L bits e, f, g, and h with respect to the pixel values Ci, Mi, Yi, and Ki included in the lower data DA22 and at least the lower L bits e, f, g, and h in the threshold Ti in the dither mask 500. For example, the second halftone processing unit UH2 is configured to generate the dot data DA3, with respect to the undetermined pixel PX2, based on the data ALi of the lower L bits with respect to the pixel values Ci, Mi, Yi, and Ki and data (threshold TLi) of the lower L bits in the threshold Ti in the dither mask 500. For convenience, FIG. 1 illustrates data (referred to as lower mask 502) in which the threshold TLi including the lower L bits e, f, g, and h is collected from the threshold Ti. When the threshold TLi is generated each time a pixel to be processed is set, the lower mask 502 is not generated. FIG. 1 illustrates an example of storing "1" (dot is available) or "0" (dot is not available) in the undetermined pixel PX2, of overwriting dot data of the undetermined pixel PX2 onto the undetermined pixel PX2 in the temporal dot data DA31, and of generating the final dot data DA3.

The dot formation unit UD0 is configured to form the dot DT0 in accordance with the dot data DA3, described above. For example, the dot formation unit UD0 is configured to form the dot DT0 of a pixel stored with "1" in the dot data DA3, while not forming the dot DT0 of a pixel stored with "0". Therefore, the output image IM1 is printed onto the print-target object ME1 in accordance with the formation state of the dot DT0.

As described above, the temporal dot data DA31 is first generated from the higher data DA21 that has been reduced in accordance with H/N, which is ½, from the original ink amount data DA2, and the lower data DA22 is used for the undetermined pixel PX2 to generate the dot data DA3. Therefore, image quality of the output image IM1 is kept maintained, while the halftone process is promptly performed.

(3) Details of Process to be Performed in Image Forming System

Figure 4:
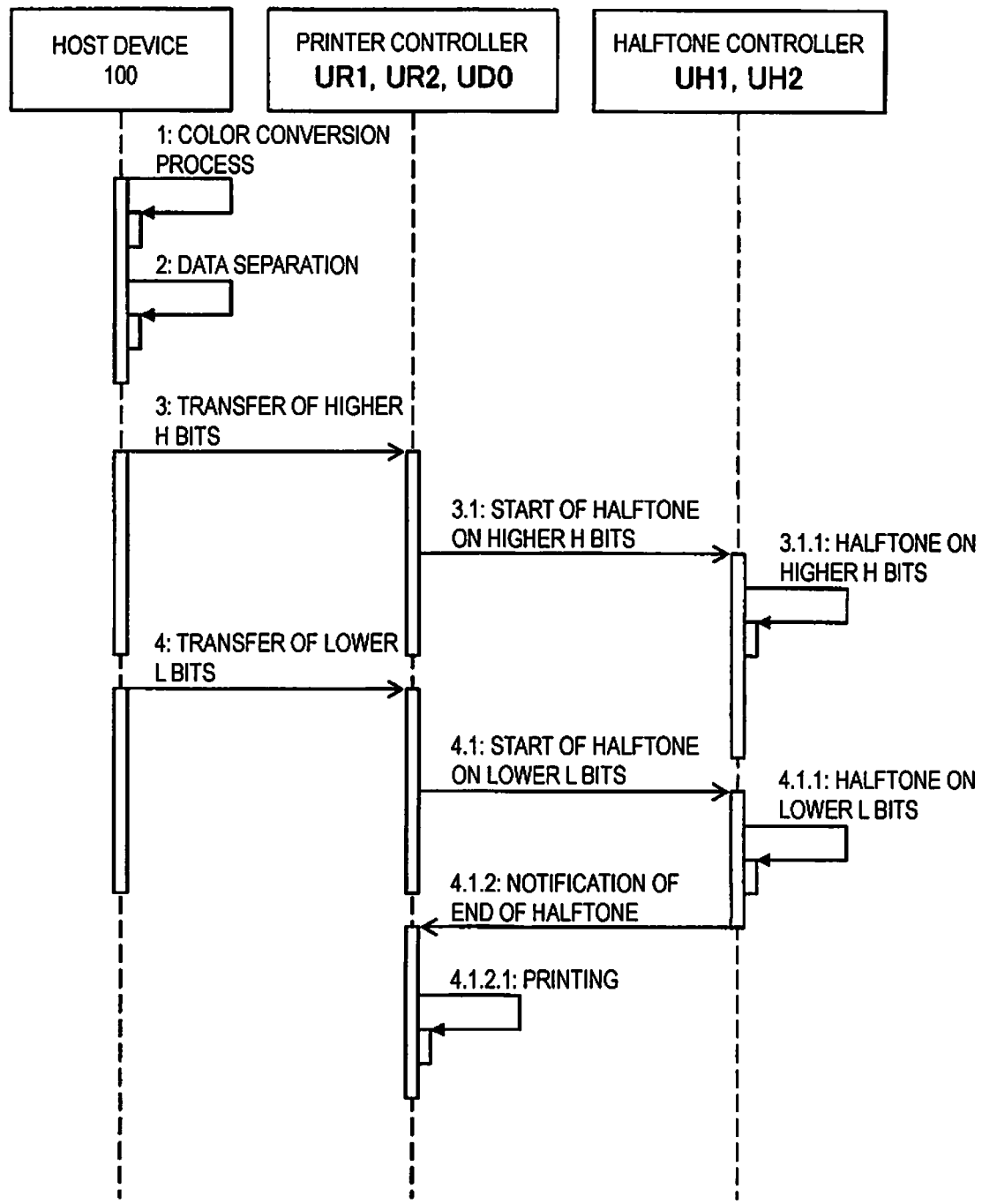
FIG. 4 is a sequence chart illustrating an example of a printing sequence.
Figure 5:
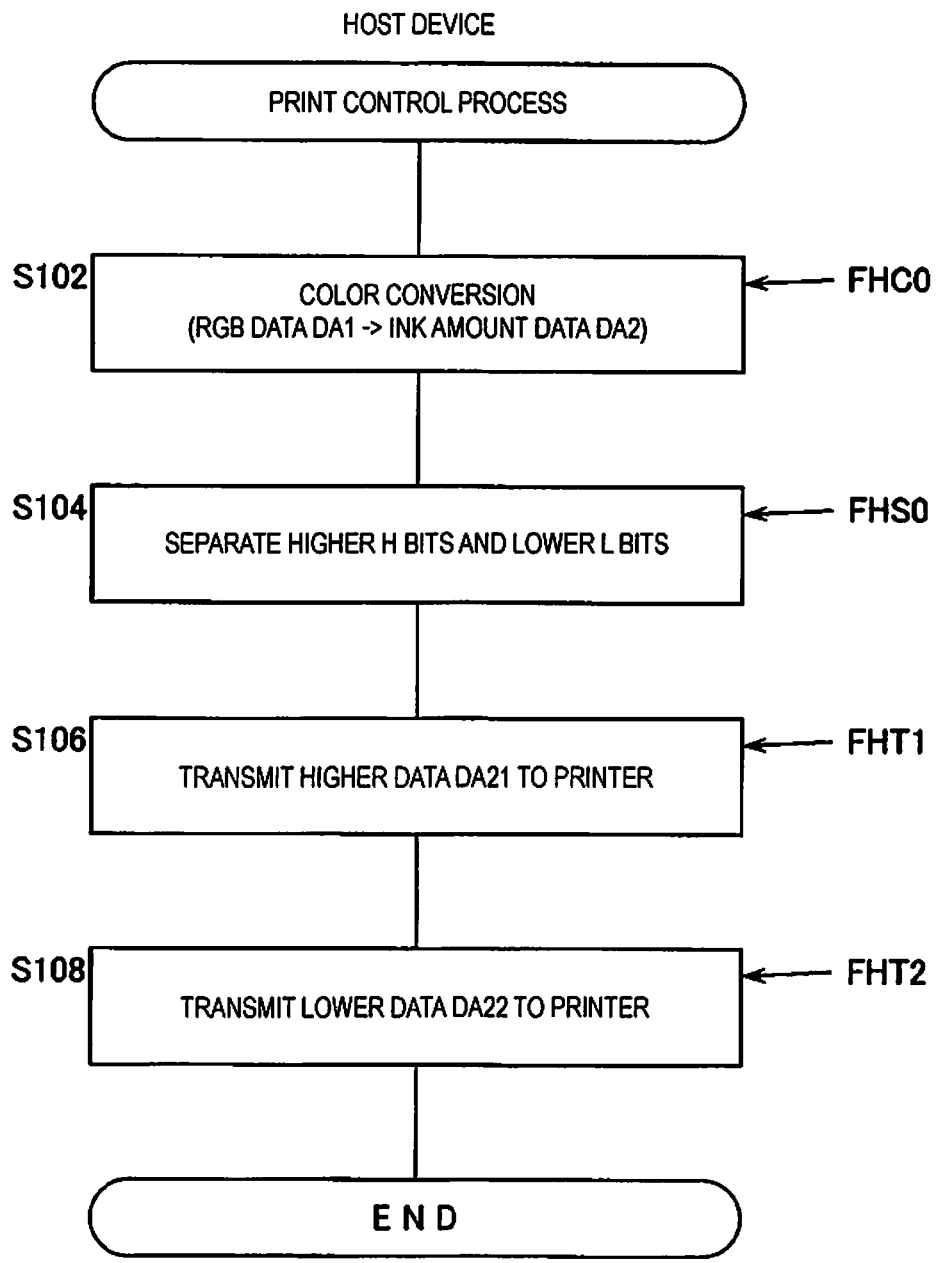
FIG. 5 is a flowchart illustrating an example of a print control process to be performed in the host device.
Figure 6:
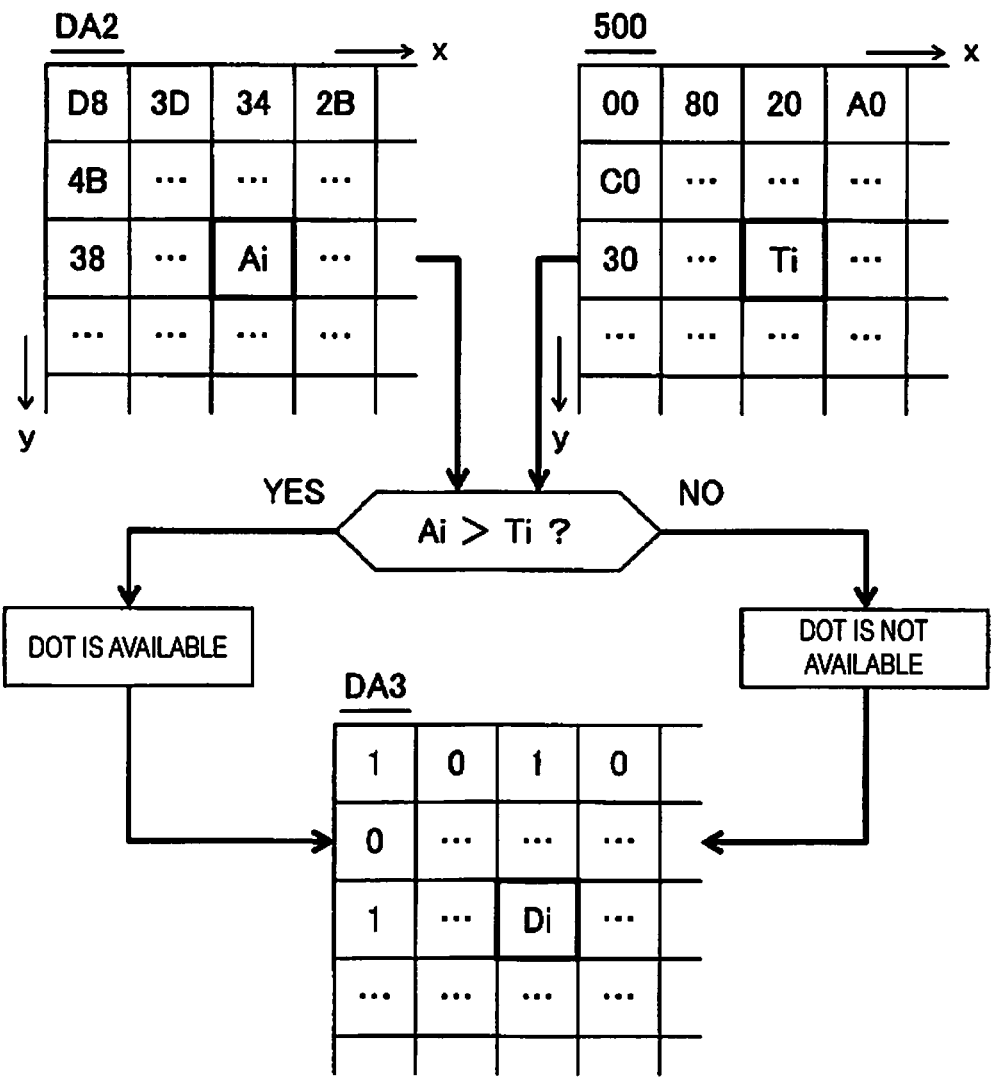
FIG. 6 is a diagram schematically illustrating an example of a halftone process based on a dither method.

FIG. 4 illustrates an example of a printing sequence to be performed in the printing system SY1. The halftone processing units UH1 and UH2 mainly perform image processing according to the specific example, while a printer control unit (reception processing units UR1 and UR2 and dot formation unit UD0) performs a print control process in conjunction with the image processing according to the specific example. FIG. 5 illustrates an example of a print control process to be performed in the host device 100. FIG. 6 schematically illustrates an example of a halftone process based on the dither method. FIG. 7 illustrates an example of a precedence halftone process to be performed in the first halftone processing unit UH1 of the controller 10 of the printer 1, together with an example of a process of receiving the higher data DA21. FIG. 8 illustrates an example of a later halftone process to be performed in the second halftone processing unit UH2 of the controller 10 of the printer 1, together with an example of a process of receiving the lower data DA22. The host device 100 and the printer 1 are capable of performing a plurality of processes in parallel. Step S102 in FIG. 5 corresponds to the color conversion unit HC0 and the color conversion function FHC0. Step S104 corresponds to the data separation unit HS0 and the data separation function FHS0. Step S106 corresponds to the first transmission processing unit HT1 and the first transmission processing function FHT1. Step S108 corresponds to the second transmission processing unit HT2 and the second transmission processing function FHT2. Step S200 in FIG. 7 corresponds to the first reception processing unit UR1 and the first reception processing function FUR1. Steps S202 to S218 correspond to the first halftone processing unit UH1 and the first halftone processing function FUH1. Step S300 in FIG. 8 corresponds to the second reception processing unit UR2 and the second reception processing function FUR2. Steps S302 to S314 correspond to the second halftone processing unit UH2 and the second halftone processing function FUH2. Step S316 corresponds to the dot formation unit UD0 and a dot formation function FUD0. The term "step" will hereinafter be omitted.

In FIGS. 4 and 5, the host device 100 first color converts the RGB data DA1 used to form the print image IM1 into the ink amount data DA2 with respect to CMYK (sequence 1, S102). The color conversion process may be a process of acquiring the pixel values Ci, Mi, Yi, and Ki corresponding to the pixel values Ri, Gi, and Bi by referring to a color conversion look-up table specified with a correspondence relationship between tone values of RGB and tone values of CMYK, for example.

After color converted, the host device 100 separates the ink amount data DA2 into the higher data DA21 of higher H bits and the lower data DA22 of lower L bits (sequence 2, S104). The separation process may be a process of generating the higher data DA21 in which data of the higher H bits with respect to the pixel values Ci, Mi, Yi, and Ki is collected from the ink amount data DA2, and the data is reduced into a size conforming to H/N, and of generating the lower data DA22 in which data of the lower L bits with respect to the pixel values Ci, Mi, and Yi, Ki is collected from the ink amount data DA2, and the data is reduced into a size conforming to L/N, for example.

After the higher data DA21 is generated, the host device 100 transmits the higher data DA21 to the printer 1 (sequence 3, S106). Sequence 3 triggers the process illustrated in FIG. 7 to start. After the lower data DA22 is generated, the host device 100 transmits the lower data DA22 to the printer 1 (sequence 4, S108), and ends the print control process. The sequence 4 triggers the process illustrated in FIG. 8 to start.

The halftone processing units UH1 and UH2 of the printer 1 use the dither mask 500 formed into a matrix shape to convert the ink amount data DA2 into the dot data DA3. An ordinary halftone process based on the general dither method will now first be described with reference to FIG. 6. FIG. 6 illustrates, in hexadecimal numbers, the pixel value Ai in the ink amount data DA2 and the threshold Ti in the dither mask 500.

As illustrated in FIG. 6, the threshold Ti is arranged in order in the dither mask 500 in the x direction (horizontal direction) and the y direction (vertical direction) in line with the pixel PX0 in the ink amount data DA2. When, in at least one of the x direction and y direction, a size of the ink amount data DA2 is greater than a size of the dither mask 500, by repeatedly arranging values in the dither mask 500 in at least one of the x direction and y direction, the threshold Ti used to compare with the pixel value Ai is determined. The pixel value Ai is one of the pixel values Ci, Mi, Yi, and Ki. The pixel value Ai and the threshold Ti are respectively compared with each other per each of CMYK. As for the pixel i (pixel surrounded by a bold line) being focused on, which is to be sequentially set in the x direction and the y direction, the pixel value Ai and the threshold Ti are compared with each other. As a result of comparison, the binary value Di is determined. The binary value Di is one of the binary values ci, mi, yi, and ki. For example, when the pixel value Ai is greater than the threshold Ti, the binary value Di is determined to "1" (dot is available). When the pixel value Ai is equal to or below the threshold Ti, the binary value Di is determined to have a value of "0" (dot is not available). The halftone processing units UH1 and UH2, described later, follow this determination criterion. Obviously, when an inequality of Ai≥Ti is satisfied, Di may be determined to 1, while, when an inequality Ai<Ti is satisfied, Di may be determined to have a value of 0.

A process when the higher data DA21 is received from the host device 100, for example, will first be described with reference to FIG. 7. The precedence halftone process illustrated in FIG. 7 will be performed per each of CMYK. Upon receiving the higher data DA21 from the host device 100, the communication I/F 72 of the printer 1 stores the higher data DA21 in the RAM 20 (S200, sequence 3.1 in FIG. 4). The controller 10 of the printer 1 then starts the precedence halftone process (sequence 3.1.1 in FIG. 4) to set the pixel i to be processed (e.g., the pixel surrounded by the bold line in FIG. 1) from among the pixels PX0 in the higher data DA21 (S202). After setting the pixel to be processed, the controller 10 acquires the data AHi of the higher H bits a, b, c, and d in the pixel i to be processed from the higher data DA21 (S204). The controller 10 further acquires data (threshold THi) of the higher H bits a, b, c, and d in the threshold Ti corresponding to the pixel i to be processed from the dither mask 500 (S206). At and after S208, the controller 10 determines a value of the pixel PX0 in the temporal dot data DA31 in accordance with a size relationship between the higher data AHi and the threshold THi.

Data of the lower L bits e, f, g, and h in the pixel value Ai will hereinafter be referred to as the lower data ALi, while data of the lower L bits e, f, g, and h in the threshold Ti will hereinafter be referred to as the threshold TLi. The original pixel value Ai and the original threshold Ti take the following values.

$$Ai = 16 \cdot AHi + ALi$$

$$Ti = 16 \cdot THi + TLi$$

Where the lower data ALi ranges from 0 to 15, and the threshold TLi ranges from 0 to 15. When neither the lower data ALi nor the threshold TLi are known, the values are as follows.

$$16 \cdot AHi \leq Ai \leq 16 \cdot AHi + 15$$

$$16 \cdot THi \leq Ti \leq 16 \cdot THi + 15.$$

When the higher data AHi is greater than the threshold THi, an inequality of Ai>Ti is normally satisfied. In this case, a formation state of a dot in the pixel i to be processed is determined that the dot is available, regardless of the lower data ALi and the threshold TLi. When the higher data AHi is smaller than the threshold THi, an inequality of Ai<Ti is normally satisfied. In this case, a formation state of a dot in the pixel i to be processed is determined that the dot is not available, regardless of the lower data ALi and the threshold TLi. When the higher data AHi is equal to the threshold THi, whether a dot of the pixel i to be processed is available for formation will not be determined. This is due to that, when the lower data ALi is greater than the threshold TLi, an inequality of Ai>Ti is satisfied, determining that the dot is available, while, when the lower data ALi is equal to or below the threshold TLi, an inequality of Ai≥Ti is satisfied, determining that the dot is not available.

In the example illustrated in FIG. 7, the controller 10 first allows the process to branch in accordance with whether the higher data AHi is equal to the threshold THi (S208). When AHi is equal to THi, the higher H bits do not allow a determination of whether a dot is available for formation. In this case, the controller 10 sets the binary value Di to −1 (undetermined) (S210), and allows the process to proceed to S218. In this case, the pixel i to be processed represents the undetermined pixel PX2 for which a formation state of the dot DT0 is not determined. The controller 10 further allows the process to branch in accordance with whether the higher data AHi is greater than the threshold THi (S212). When an inequality of AHi>THi is satisfied, it is determined that the dot is available regardless of data of lower L bits. In this case, the controller 10 sets the binary value Di to 1 (dot is available) (S214), and allows the process to proceed to S218. In this case, the pixel i to be processed represents the determined pixel PX1 for which a formation state of the dot DT0 is determined. On the other hand, when an inequality of AHi<THi is satisfied, it is determined that the dot is not available regardless of data of lower L bits. In this case, the controller 10 sets the binary value Di to 0 (dot is not available) (S216), and allows the process to proceed to S218. In this case, the pixel i to be processed represents the determined pixel PX1 for which a formation state of the dot DT0 is determined.

Processing from S202 to S216, described above, will be repeated until the pixel PX0 is set as the pixel i to be processed in the higher data DA21 wholly (S218). Upon the precedence halftone process ending, the temporal dot data DA31 of the pixel PX0 stored with a value of 1 (dot is available), 0 (dot is not available), or −1 (undetermined) is acquired.

Figure 9:
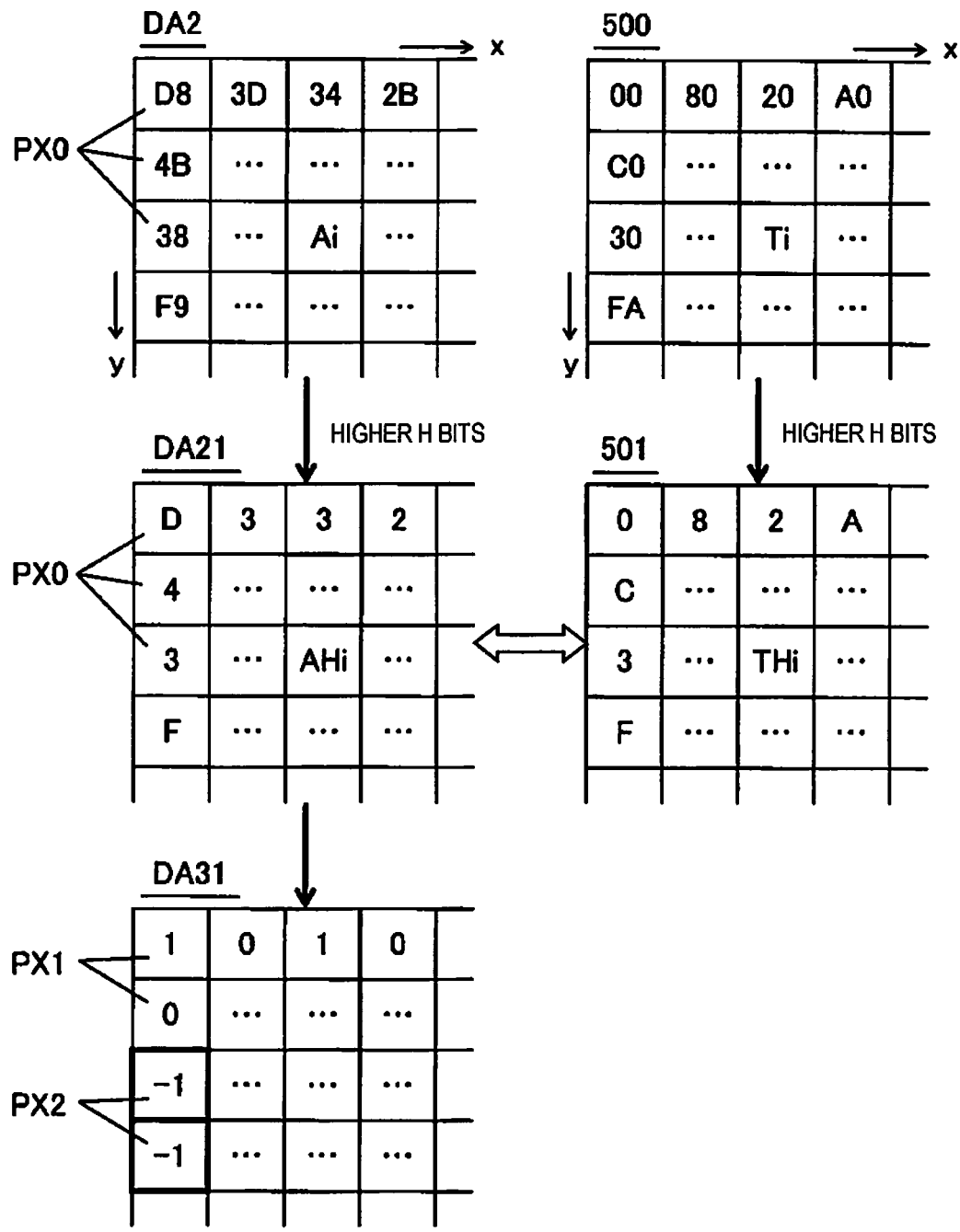
FIG. 9 is a diagram schematically illustrating an example of generating temporal dot data based on data of higher H bits.

FIG. 9 illustrates an example of generating the temporal dot data DA31 from higher H bits in the pixel value Ai in the ink amount data DA2 and higher H bits in the threshold Ti in the dither mask 500. FIG. 9 also illustrates, in hexadecimal numbers, the pixel values Ai and AHi and the thresholds Ti and THi. For example, when Ai is D8 and Ti is 00, the data AHi, which is D in the higher data DA21, is greater than the threshold THi, which is 0 in the higher mask 501. Therefore, the pixel to be processed becomes the determined pixel PX1 with a value of 1 (dot is available). When Ai is 4B and Ti is C0, the data AHi, which is 4 in the higher data DA21, is smaller than the threshold THi, which is C in the higher mask 501. Therefore, the pixel to be processed becomes the determined pixel PX1 with a value of 0 (dot is not available). When Ai is 38 and Ti is 30, the data AHi, which is 3 in the higher data DA21, is equal to the threshold THi, which is 3 in the higher mask 501. Therefore, the pixel to be processed becomes the undetermined pixel PX2 with a value of −1.

As described above, the controller 10 determines, as the determined pixel PX1, a pixel in which the data AHi of higher H bits in the pixel value Ai and the threshold THi for higher H bits in the dither mask differ from each other to generate the dot data DA3 with respect to the determined pixel PX1.

Next, a process when the lower data DA22 is received from the host device 100 will be described with reference to FIG. 8, for example. The later halftone process illustrated in FIG. 8 will be performed per each of CMYK. Upon receiving the lower data DA22 from the host device 100, the communication I/F 72 of the printer 1 stores the lower data DA22 in the RAM 20 (S300, sequence 4.1 in FIG. 4). The controller 10 of the printer 1 then starts the later halftone process (sequence 4.1.1 in FIG. 4) to set the pixel i to be processed from among the undetermined pixels PX2 in the higher data DA21 (S302). After setting the pixel to be processed, the controller 10 acquires the data ALi of the lower L bits e, f, g, and h in the pixel i to be processed from the lower data DA22 (S304). The controller 10 further acquires data (threshold THi) of the lower L bits e, f, g, and h in the threshold Ti corresponding to the pixel i to be processed from the dither mask 500 (S306). At and after S308, the controller 10 determines a value of the undetermined pixel PX2 in the temporal dot data DA31 in accordance with a size relationship between the lower data ALi and the threshold TLi.

In the undetermined pixel PX2, the higher data AHi and the threshold AHi are identical to each other. Therefore, when the lower data ALi is greater than the threshold TLi, an inequality of Ai>Ti is satisfied, determining that the dot is available. When the lower data ALi is equal to or below the threshold TLi, an equality of Ai≥Ti is satisfied, determining that the dot is not available.

Based on this, the controller 10 allows the process to branch in accordance with whether the lower data ALi is greater than the threshold TLi (S308). When an inequality of ALi>TLi is satisfied, the controller 10 sets the binary value Di to 1 (dot is available) (S310), and allows the process to proceed to S314. On the other hand, when an inequality of ALi TLi is satisfied, the controller 10 sets the binary value Di to 0 (dot is not available) (S312), and allows the process to proceed to S314.

Processing from S302 to S312, described above, will be repeated until the undetermined pixel PX2 is set as the pixel i to be processed in the higher data DA21 wholly (S314). Upon the later halftone process ending, a value of −1 (undetermined) of the undetermined pixel PX2 is replaced to 1 (dot is available) or 0 (dot is not available), and the final dot data DA3 is acquired. At this point in time, the halftone processing unit UH0 notifies the end of halftone to the signal transmitter 44 (sequence 4.1.2 in FIG. 4).

Figure 10:
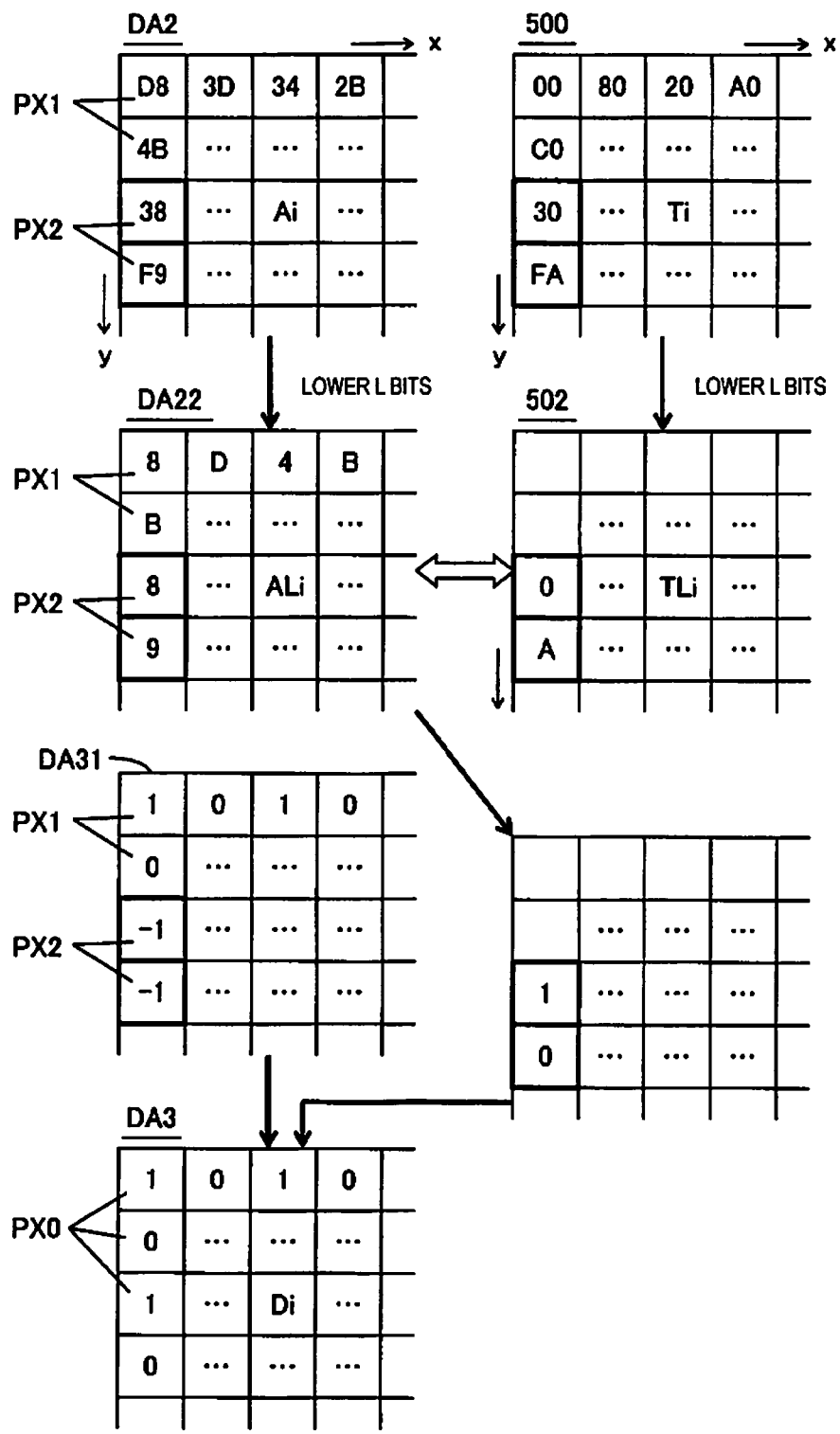
FIG. 10 is a diagram schematically illustrating an example of generating dot data based on data of lower L bits.

FIG. 10 illustrates an example of determining the binary value Di of the undetermined pixel PX2 from lower L bits in the pixel value Ai in the ink amount data DA2 and lower L bits in the threshold Ti in the dither mask 500 to generate the dot data DA3. FIG. 10 also illustrates, in hexadecimal numbers, the pixel values Ai and ALi and the thresholds Ti and TLi. For example, when Ai is 38 and Ti is 30 for the undetermined pixel PX2, the data ALi, which is 8 in the lower data DA22, is greater than the threshold TLi, which is 0 in the lower mask 502. Therefore, the undetermined pixel PX2 is determined to have a value of 1 (dot is available). When Ai is F9 and Ti is FA for the undetermined pixel PX2, the data ALi, which is 9 in the lower data DA22, is equal to or below the threshold TLi, which is A in the lower mask 502. Therefore, the undetermined pixel PX2 is determined to have a value of 0 (dot is not available).

As described above, the controller 10 generates the dot data DA3 based on lower L bits in the pixel value Ai and lower L bits in the dither mask 500 for the undetermined pixel PX2.

After dot data is generated, the signal transmitter 44 of the controller 10 generates the drive signal SG from the dot data DA3 to output the drive signal SG to the drive circuit 62 (S316, sequence 4.1.2.1 in FIG. 4). Therefore, the recording head 60 ejects the ink droplets 67 so that the dots DT0 represented by the dot data DA3 are formed. As a result, the plurality of dots DT0 form the print image IM1 on the print-target object ME1.

Figure 11:
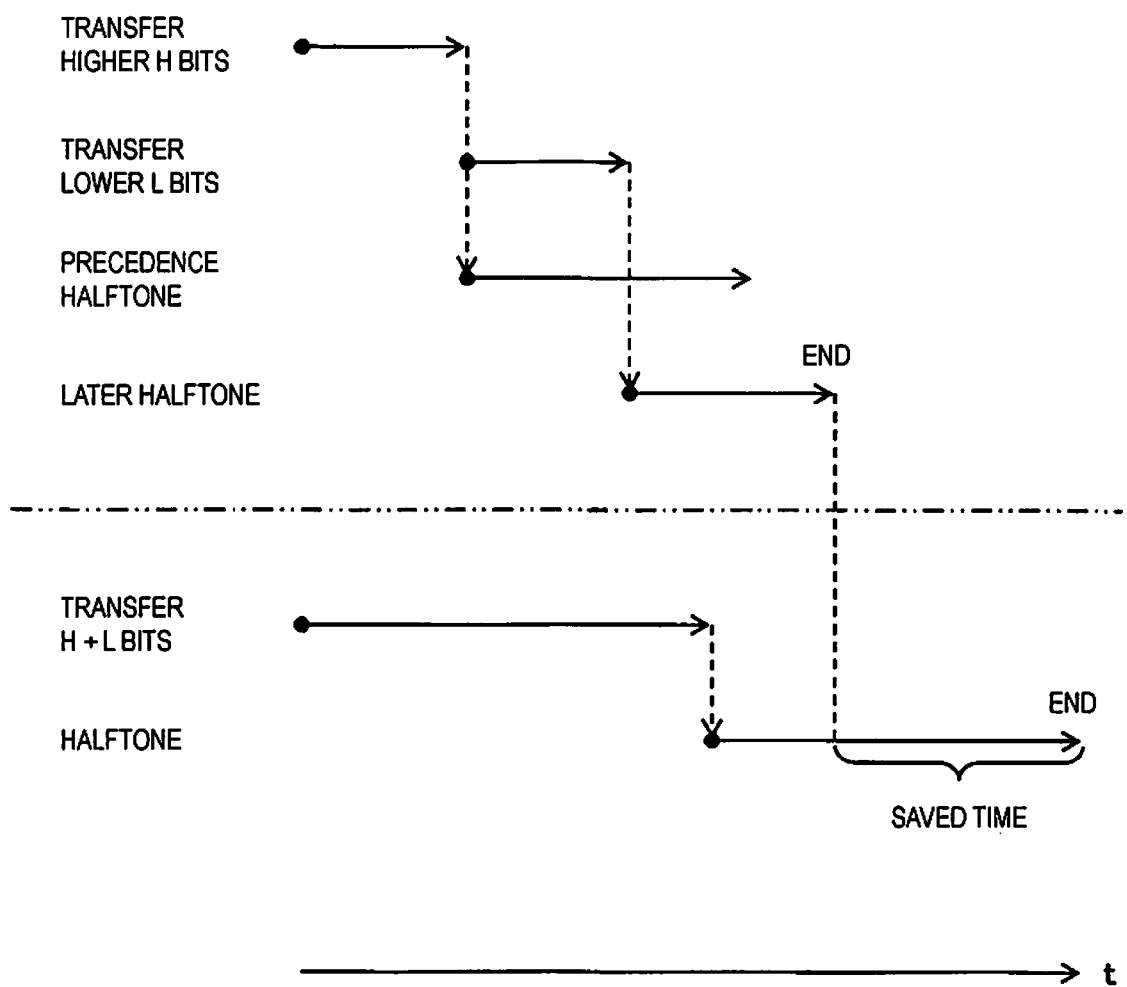
FIG. 11 is a diagram schematically illustrating an example of a saved time in data transfer and a halftone process.

FIG. 11 illustrates an example of comparing times of transferring the ink amount data DA2 and performing the halftone process when higher H bits and lower L bits are separated (above a two-dot chain line) and when higher H bits and lower L bits are not separated (below the two-dot chain line). In FIG. 11, a horizontal axis represents an axis for time t, and arrows illustrate that the process is in execution. FIG. 11 illustrates an example in which the halftone process starts at a point of time when data to be undergone the halftone process is fully transferred. When it is assumed that a time to transfer data be in proportion to a data amount, a time to transfer the higher data DA21 conforms to a value of approximately H/N of a time to transfer the non-separated ink amount data DA2, while a time to transfer the lower data DA22 conforms to a value of approximately L/N of a time to transfer the non-separated ink amount data DA2. Therefore, a total time to transfer the higher data DA21 and the lower data DA22 is almost equal to a time to transfer the non-separated ink amount data DA2. In actual cases, however, when the higher data DA21 in which higher H bits are collected or the lower data DA22 in which lower L bits are collected is compressed, identical bit values often continue, increasing compression efficiency and shortening a transfer time, compared with a case when the original ink amount data DA2 is compressed.

In the halftone process, upon fully transferring the lower data DA22, at least a part of the precedence halftone process ends. The later halftone process then ends in a shorter period of time because the targets of the process are limited to the undetermined pixels PX2 in the higher data DA21. Therefore, as illustrated in FIG. 11, separating the ink amount data DA2 into higher H bits and lower L bits shortens a time to complete the halftone process. When some of the undetermined pixels PX2 in the higher data DA21 are determined, the precedence halftone process and the later halftone process are performed in parallel, as illustrated in FIG. 11. Therefore, a time to complete the halftone process is further shortened.

When Single Instruction Multiple Data (SIMD) is applied in the halftone process, a time to complete the halftone process is further shortened. SIMD refers to simultaneously applying a single instruction to a plurality of pieces of data to process the pieces of data in parallel.

Figure 12A:
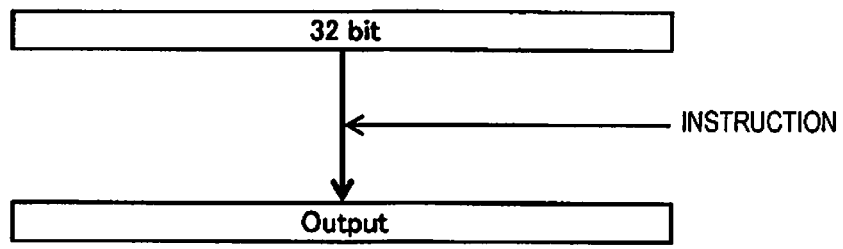
FIGS. 12A to 12C are diagrams schematically illustrating Single Instruction Multiple Data (SIMD).
Figure 12B:
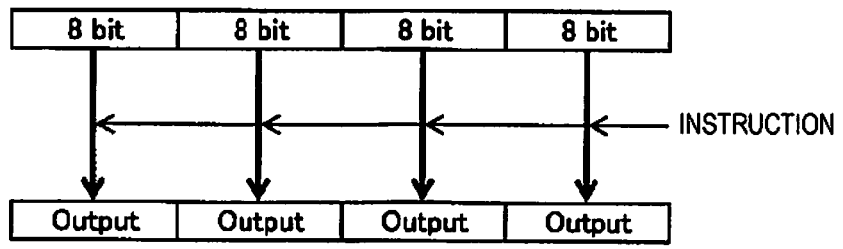
Figure 12C:
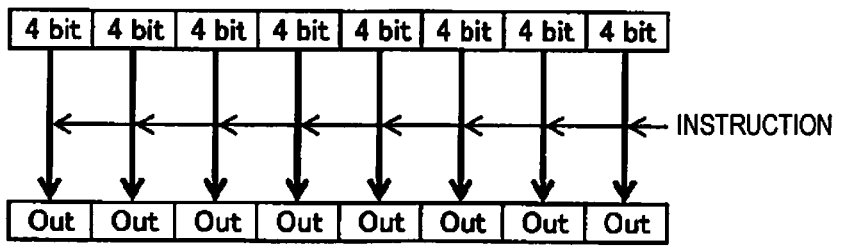

As illustrated in FIGS. 12A to 12C, the CPU 11 of the controller 10 allows a 32-bit register to read data to perform a process. FIG. 12A illustrates a case of allowing a register to read 32-bit data, executing an instruction, and acquiring a result. When eight-bit data is fully rendered, as illustrated in FIG. 12B, allowing the register to collectively read four pieces of eight-bit data, applying an instruction to the four pieces of data, and processing the four pieces of data in parallel shortens a processing time to a time of approximately ¼ of an ordinary processing time. When four-bit data is fully rendered, as illustrated in FIG. 12C, allowing the register to collectively read eight pieces of four-bit data, applying an instruction to the eight pieces of data, and processing the eight pieces of data in parallel shortens a processing time to a time of approximately ⅛ of an ordinary processing time.

Figure 13:
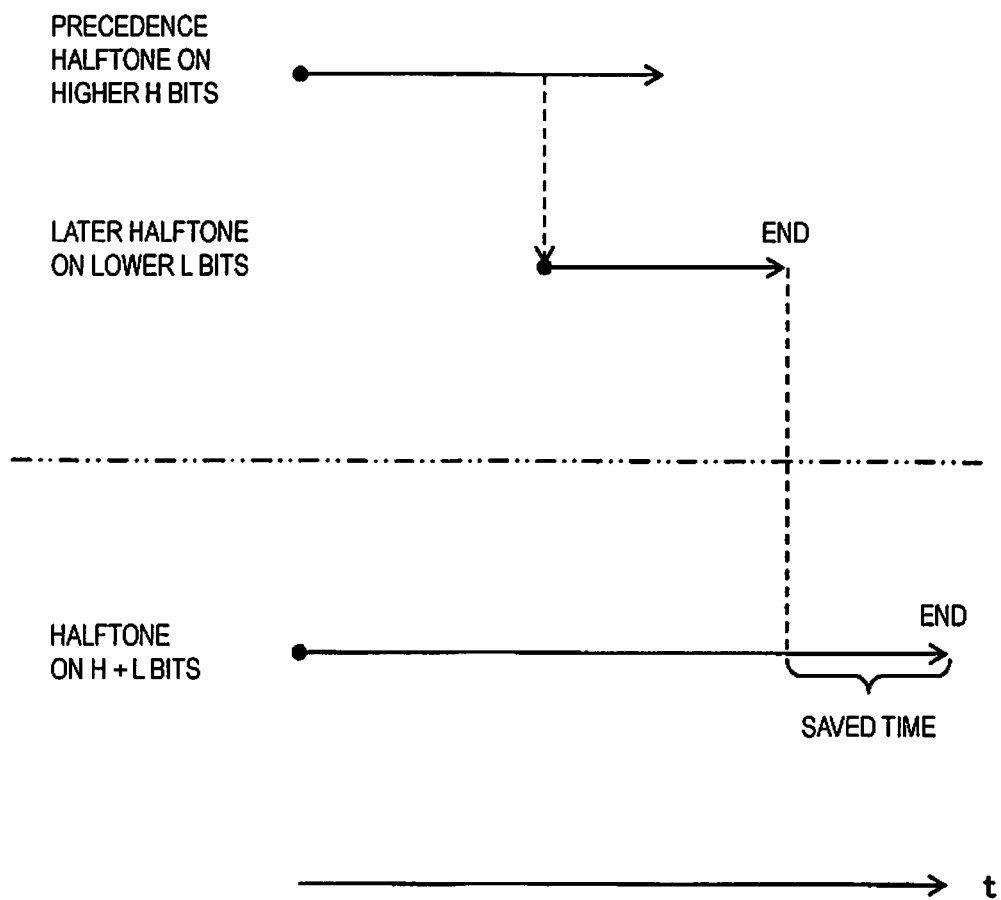
FIG. 13 is a diagram schematically illustrating an example of a saved time in a halftone process.

FIG. 13 illustrates an example of comparing, when SIMD is applied, times of performing the halftone process on the ink amount data DA2 when higher H bits and lower L bits are separated (above a two-dot chain line) and when higher H bits and lower L bits are not separated (below the two-dot chain line). In FIG. 13, a horizontal axis represents an axis for time t, while arrows illustrate that the process is in execution. As illustrated in a lower side of FIG. 13, when the halftone process is simply performed on the ink amount data DA2 where N is eight bits, four pieces of eight-bit data are processed in parallel, as illustrated in FIG. 12B.

As illustrated in an upper side of FIG. 13, when the halftone process is performed on the higher data DA21 where H is four bits, eight pieces of four-bit data are processed in parallel, as illustrated in FIG. 12C. Therefore, a time to perform halftone processing on the higher data DA21 becomes approximately ½ of a time to perform halftone processing on the non-separated ink amount data DA2. The later halftone process then ends in a shorter period of time because the targets of the process are limited to the plurality of undetermined pixels PX2 in the higher data DA21. Therefore, as illustrated in FIG. 13, separating the ink amount data DA2 into higher H bits and lower L bits shortens a time to complete the halftone process. When some of the undetermined pixels PX2 in the higher data DA21 are determined, the precedence halftone process and the later halftone process are performed in parallel, as illustrated in FIG. 13. Therefore, a time to complete the halftone process is further shortened.

As described above, the specific example is capable of keeping image quality of an output image and speeding up the halftone process.

(4) Modified Example

The disclosure may include various modified examples. For example, color conversion from the RGB data DA1 to the ink amount data DA2 may be performed with the printer 1. In this case, the host device 100 may transmit the RGB data DA1 to the printer 1. The host device 100 may perform the precedence halftone process and the later halftone process. In this case, the host device 100 may transmit the dot data DA3 to the printer 1. The image processing program is capable of allowing the host device 100 to achieve the above described various functions. Obviously, even when the higher data DA21 and the lower data DA22 are not transferred from the host device 100 to the printer 1, image quality is kept maintained and the halftone process is promptly performed by applying SIMD, for example.

The halftone process may be a process of generating, from the ink amount data DA2, dot formation rate data indicative of a rate of forming dots varying in size, and of converting the dot formation rate data into the dot data DA3 per dot size. Therefore, dots varying in size are formed. For example, by separating the ink amount data DA2 into small dot formation rate data, middle dot formation rate data, and large dot formation rate data, small dot data indicative of whether a small dot is available for formation from the small dot formation rate data, middle dot data indicative of whether a middle dot is available for formation from the middle dot formation rate data, and large dot data indicative of whether a large dot is available for formation from the large dot formation rate data are generated. The technique is also applicable when ink amount data is directly converted, with the dither method, into multi-value data having three or more values.

The above described processes may be appropriately changed. For example, the order of the processes may be changed. For example, in the precedence halftone process in FIG. 7, processing from S212 to S216 may be performed between S206 and S208.

Figure 14:
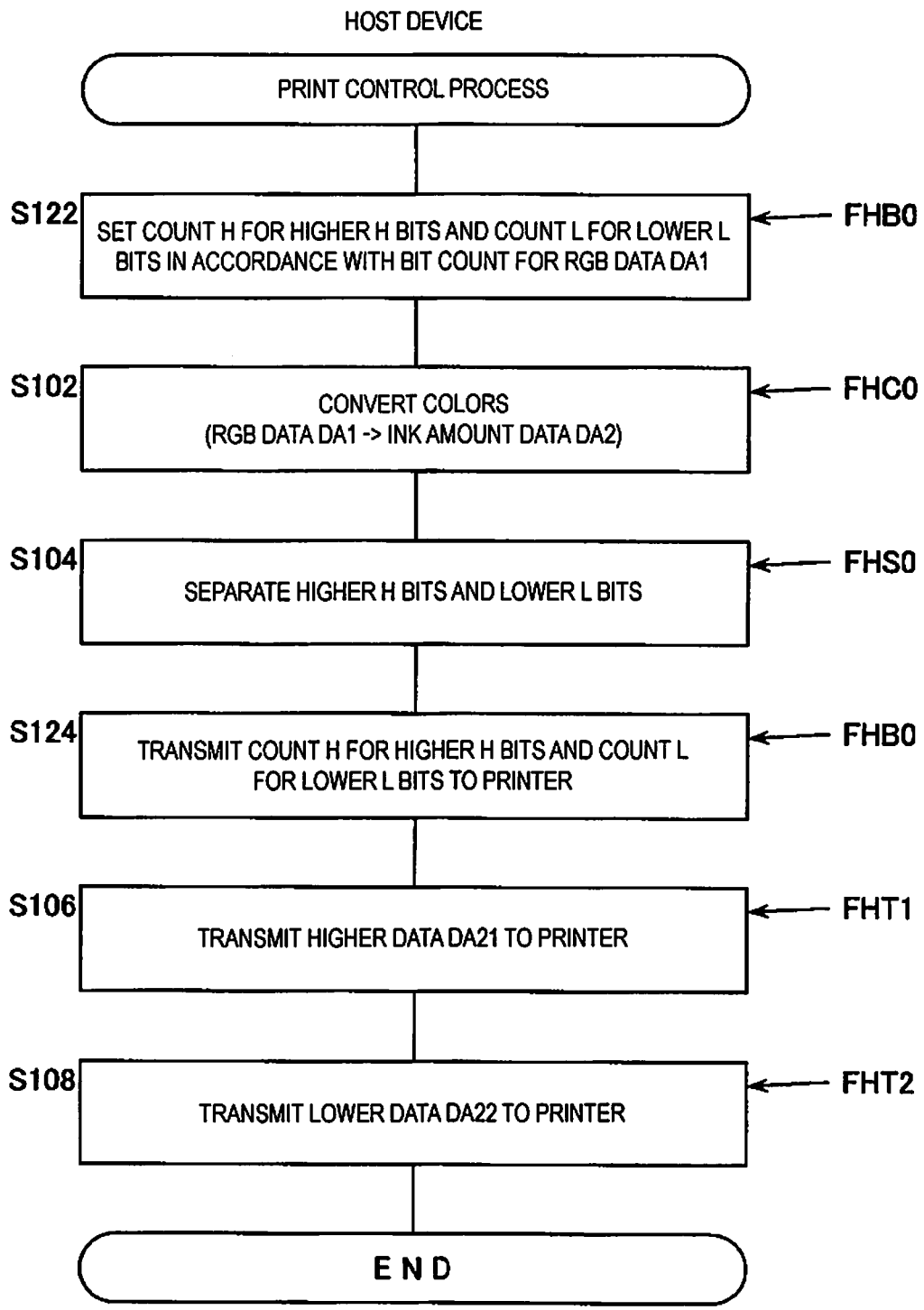
FIG. 14 is a flowchart illustrating an example of a print control process to be performed in the host device that changing a count H for higher H bits and a count L for lower L bits.

As illustrated in FIG. 14, at least one of the count H for higher H bits and the count L for lower L bits may be changeably set. A print control process illustrated in FIG. 14 is added with S122 and S124, compared with the process illustrated in FIG. 5. S122 and S124 respectively correspond to a transmission side bit count alteration unit HB0 and the transmission side bit count alteration function FHB0. Upon the process illustrated in FIG. 14 starting, the host device 100 sets the count H for higher H bits and the count L for lower L bits in accordance with a bit count for the RGB data DA1 with which the print image IM1 is to be formed, and stores the bit counts H and L in the storage device 114 (S122). For example, when a bit count for the RGB data DA1 is eight, it is assumed that the bit count N for the ink amount data DA2 be specified to eight. Therefore, H and L are both set to four. When a bit count for colors in the RGB data DA1 is 16, it is also assumed that the bit count N for the colors in the ink amount data DA2 be specified to 16. Therefore, H and L are both set to eight.

The host device 100 then color converts the RGB data DA1 into the ink amount data DA2 conforming to the bit count N (S102), and separates the ink amount data DA2 into the higher data DA21 conforming to the set bit count H and the lower data DA22 conforming to the set bit count L (S104). The host device 100 then transmits the set bit counts H and L to the printer 1 (S124). The transmission process triggers the process illustrated in FIG. 15A to start. Further, the host device 100 transmits the higher data DA21 to the printer 1 (S106), transmits the lower data DA22 to the printer 1 (S108), and ends the print control process.

FIG. 15A illustrates an example of a process to be performed in the reception side bit count alteration unit UB0. FIG. 15B illustrates an example of a precedence halftone process to be performed in accordance with the set bit counts H and L. FIG. 15C illustrates an example of a later halftone process to be performed in accordance with the set bit counts H and L. S400, S402, S222, and S322 correspond to the reception side bit count alteration unit UB0 and the reception side bit count alteration function FUB0. Upon receiving the bit counts H and L from the host device 100 (S400), the communication I/F 72 of the printer 1 calls the controller 10. The controller 10 begins the bit count setting process, allows the RAM 20 to store the bit counts H and L received from the host device 100 as the set bit counts H and L (S402), and ends the bit count setting process.

In the precedence halftone process illustrated in FIG. 15B, the controller 10 first reads the set bit counts H and L (S222). The controller 10 then performs processing from S202 to S218 illustrated in FIG. 7 in accordance with the set bit counts H and L, generates the temporal dot data DA31, and ends the precedence halftone process. In the later halftone process illustrated in FIG. 15C, the controller 10 first reads the set bit counts H and L (S322). The controller 10 then performs processing from S302 to S314 illustrated in FIG. 8 in accordance with the set bit counts H and L, generates the final dot data DA3, and ends the later halftone process.

As described above, the count H for higher H bits and the count L for lower L bits change in accordance with the bit count N for the pixel value Ai in the ink amount data DA2, improving a degree of freedom in the halftone process. Even when an inequality of H+L<N is satisfied, the count L for lower L bits may be changed without changing the count H for higher H bits, as well as the count H for higher H bits may be changed without changing the count L for lower L bits.

Figure 16:
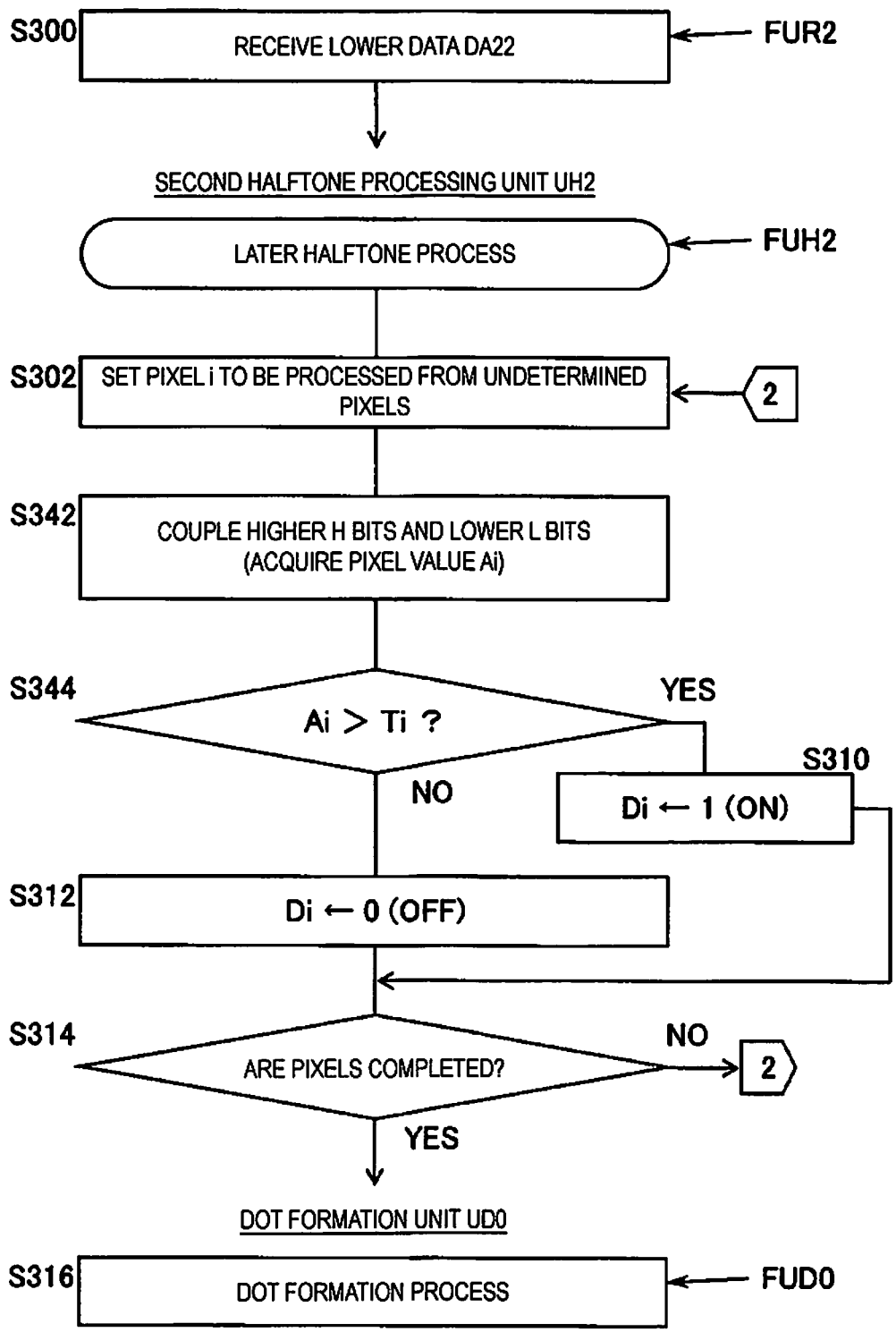
FIG. 16 is a flowchart illustrating an example of a process to be performed in the second halftone processing unit.

As illustrated in FIG. 16, the second halftone processing unit UH2 may generate the dot data DA3, with respect to the undetermined pixel PX2, based on higher H bits and lower L bits in the pixel value Ai and higher H bits and lower L bits in the dither mask 500.

In the later halftone process illustrated in FIG. 16, S342 is added, while S308 is replaced with S344, compared with the process illustrated in FIG. 8. Upon the later halftone process illustrated in FIG. 16 starting, the controller 10 sets the pixel i to be processed from among the undetermined pixels PX2 in the higher data DA21 (S302). After setting the pixel to be processed, the controller 10 couples, per each of CMYK, the higher H bits a, b, c, and d in the pixel i to be processed in the higher data DA21 and the lower L bits e, f, g, and h in the pixel i to be processed in the lower data DA22 (S342). Therefore, in the pixel i to be processed, the pixel value Ai conforming to the bit count N is recovered.

The controller 10 then allows the process to branch in accordance with whether the pixel value Ai is greater than the threshold Ti in the dither mask 500 (see FIG. 6) (S344). The threshold Ti includes the higher H bits a, b, c, and d and the lower L bits e, f, g, and h. When an inequality of Ai>Ti is satisfied, the controller 10 sets the binary value Di to 1 (dot is available) (S310), and allows the process to proceed to S314. On the other hand, when an inequality of Ai≥Ti is satisfied, the controller 10 sets the binary value Di to 0 (dot is not available) (S312), and allows the process to proceed to S314.

Processing S302, S342, S344, S310, and S312, described above, will be repeated until the undetermined pixel PX2 is set as the pixel i to be processed in the higher data DA21 wholly (S314). Therefore, the dot data DA3 is generated, with respect to the undetermined pixel PX2, based on higher H bits and lower L bits in the pixel value Ai and higher H bits and lower L bits in the dither mask 500. The modified example is also capable of keeping image quality of an output image and speeding up the halftone process.

As described above, the disclosure is capable of providing, in various aspects, a technique capable of keeping image quality and speeding up the halftone process, for example. Obviously, a technique including components according to one or more of the independent claims also acquires the above described basic actions and effects. Various configurations are also implementable, including a configuration in which one or more of the configurations and combinations disclosed in the above described examples are replaced or changed, and a configuration in which one or more of the configurations and combinations disclosed in known techniques and the above described examples are replaced or changed, for example. The disclosure includes such configurations, for example.

This application claims priority under 35 U.S.C. § 119 to Japanese Patent Application No. 2017-142702, filed Jul. 24, 2017. The entire disclosure of Japanese Patent Application No. 2017-142702 is hereby incorporated herein by reference.

What is claimed is:

1. An image processing device configured to perform a halftone process on image data in which a pixel has a pixel value conforming to a bit count N, wherein bits conforming to the bit count N include higher H bits, H being an integer satisfying an inequality of $1 \leq H < N$, and lower L bits following the higher H bits, L being an integer satisfying an inequality of $1 \leq L \leq N-H$, the image processing device comprising:

a first halftone processing unit configured to generate dot data in which stores "1" or "0" indicative of a formation state of a dot, with respect to a first pixel allowing a determination of a formation state of a dot, by comparing data of the higher H bits in the pixel value of the first pixel with data of higher H bits of a threshold which corresponds to the first pixel in a dither mask, H of the higher H bits of the threshold being equal to H of the higher H bits of the pixel value of the first pixel; and a second halftone processing unit configured to generate dot data, with respect to a second pixel disallowing the first halftone processing unit to determine a formation state of a dot, based on at least the lower L bits in the pixel value and at least lower L bits in the dither mask.

2. The image processing device according to claim 1, wherein the second halftone processing unit generates the dot data, with respect to the second pixel, by comparing data of the lower L bits in the pixel value of the second pixel with data of the lower L bits of a threshold which corresponds to the second pixel in the dither mask, and L of the lower L bits of the threshold is equal to L of the lower L bits of the pixel value of the second pixel.

3. The image processing device according to claim 1, wherein the first halftone processing unit determines, as the first pixel, a pixel in which the data of the higher H bits in the pixel value and the data of the higher H bits in the dither mask differ from each other to generate the dot data with respect to the first pixel.

4. The image processing device according to claim 2, wherein the first halftone processing unit determines, as the first pixel, a pixel in which the data of the higher H bits in the pixel value and the data of the higher H bits in the dither mask differ from each other to generate the dot data with respect to the first pixel.

5. The image processing device according to claim 1, wherein the first halftone processing unit determines, with respect to the first pixel, when a value of the data of the higher H bits in the pixel value is greater than a value of the data of the higher H bits in the dither mask, the dot data to a value with which a dot is to be formed, the first halftone processing unit determines, with respect to the first pixel, when the value of the data of the higher H bits in the pixel value is smaller than the value of the data of the higher H bits in the dither mask, the dot data to a value with which no dot is to be formed, the second halftone processing unit determines, with respect to the second pixel, when a value of lower L bits in the pixel value is greater than at least a value of higher H bits in the dither mask, the dot data to a value with which a dot is to be formed, and the second halftone processing unit determines, with respect to the second pixel, when the value of the lower L bits in the pixel value is smaller than at least the value of the higher H bits in the dither mask, the dot data to a value with which no dot is to be formed.

6. The image processing device according to claim 2, wherein the first halftone processing unit determines, with respect to the first pixel, when a value of the data of the higher H bits in the pixel value is greater than a value of the data of the higher H bits in the dither mask, the dot data to a value with which a dot is to be formed, the first halftone processing unit determines, with respect to the first pixel, when the value of the data of the higher H bits in the pixel value is smaller than the value of the data of the higher H bits in the dither mask, the dot data to a value with which no dot is to be formed, the second halftone processing unit determines, with respect to the second pixel, when a value of the data of the lower L bits in the pixel value is greater than at least a value of the data of the higher H bits in the dither mask, the dot data to a value with which a dot is to be formed, and the second halftone processing unit determines, with respect to the second pixel, when the value of the data of the lower L bits in the pixel value is smaller than at least the value of the data of the higher H bits in the dither mask, the dot data to a value with which no dot is to be formed.

7. The image processing device according to claim 3, wherein the first halftone processing unit determines, with respect to the first pixel, when a value of the data of the higher H bits in the pixel value is greater than a value of the data of the higher H bits in the dither mask, the dot data to a value with which a dot is to be formed, the first halftone processing unit determines, with respect to the first pixel, when the value of the data of the higher H bits in the pixel value is smaller than the value of the data of the higher H bits in the dither mask, the dot data to a value with which no dot is to be formed, the second halftone processing unit determines, with respect to the second pixel, when a value of lower L bits in the pixel value is greater than at least a value of higher H bits in the dither mask, the dot data to a value with which a dot is to be formed, and the second halftone processing unit determines, with respect to the second pixel, when the value of the lower L bits in the pixel value is smaller than at least the value of the higher H bits in the dither mask, the dot data to a value with which no dot is to be formed.

8. The image processing device according to claim 1, further comprising a bit count alteration unit configured to alter a bit count for at least one of higher H bits included in bits conforming to the bit count N or lower L bits included in the bits conforming to the bit count N, or both.

9. The image processing device according to claim 2, further comprising a bit count alteration unit configured to alter a bit count for at least one of higher H bits included in bits conforming to the bit count N or lower L bits included in the bits conforming to the bit count N, or both.

10. The image processing device according to claim 3, further comprising a bit count alteration unit configured to alter a bit count for at least one of higher H bits included in bits conforming to the bit count N or lower L bits included in the bits conforming to the bit count N, or both.

11. The image processing device according to claim 4, further comprising a bit count alteration unit configured to alter a bit count for at least one of higher H bits included in bits conforming to the bit count N or lower L bits included in the bits conforming to the bit count N, or both.

12. An image processing system comprising:

a host device configured to transmit image data in which a pixel has a pixel value conforming to a bit count N; and an image processing device configured to receive the image data from the host device to perform a halftone process on the image data, wherein bits conforming to the bit count N include higher H bits, H being an integer satisfying an inequality of 1≤H<N, and lower L bits following the higher H bits, L being an integer satisfying an inequality of 1≤L≤N−H, the host device includes:

a first transmission processing unit configured to transmit, to the image processing device, first data in which data of the higher H bits in the pixel value is collected from the image data; and a second transmission processing unit configured to transmit, after the first data is transmitted, to the image processing device, second data in which data of the lower L bits in the pixel value is collected from the image data, and the image processing device includes:

a first reception processing unit configured to receive the first data;

a first halftone processing unit configured to generate dot data in which stores "1" or "0" indicative of a formation state of a dot, with respect to a first pixel allowing a determination of a formation state of a dot, by comparing the data of the higher H bits in the pixel value of the first pixel with data of higher H bits of a threshold which corresponds to the first pixel in a dither mask, H of the higher H bits of the threshold being equal to H of the higher H bits of the pixel value of the first pixel;

a second reception processing unit configured to receive the second data; and a second halftone processing unit configured to generate the dot data, with respect to a second pixel disallowing the first halftone processing unit to determine a formation state of a dot, based on at least the lower L bits in the pixel value included in the second data and at least lower L bits in the dither mask.

13. A non-transitory computer readable medium storing an image processing program configured to perform a halftone process on image data in which a pixel has a pixel value conforming to a bit count N, wherein bits conforming to the bit count N include higher H bits, H being an integer satisfying an inequality of $1 \leq H < N$, and lower L bits following the higher H bits, L being an integer satisfying an inequality of $1 \leq L \leq N-H$, the image processing program stored in the non-transitory computer readable medium allowing a computer to achieve functions, the functions comprising:

a first halftone processing function generating dot data in which stores "1" or "0" indicative of a formation state of a dot, with respect to a first pixel allowing a determination of a formation state of a dot, by comparing data of the higher H bits in the pixel value of the first pixel with data of higher H bits of a threshold which corresponds to the first pixel in a dither mask, H of the higher H bits of the threshold being equal to H of the higher H bits of the pixel value of the first pixel; and a second halftone processing function generating the dot data, with respect to a second pixel disallowing the first halftone processing function to determine a formation state of a dot, based on at least the lower L bits in the pixel value and at least lower L bits in the dither mask.

* * * * *